US011623875B2

(12) United States Patent
Atwater et al.

(10) Patent No.: US 11,623,875 B2
(45) Date of Patent: Apr. 11, 2023

(54) STABILIZED LITHIUM, MANGANESE $AB_2O_4$ SPINEL FOR RECHARGEABLE LITHIUM ELECTROCHEMICAL SYSTEMS THROUGH A AND B SITE DOPING, METHOD OF PREPARING THE SAME, AND LI ELECTROCHEMICAL CELL CONTAINING THE SAME

(71) Applicant: United States Government, as represented by the Secretary of the Army, Aberdeen Proving Ground, MD (US)

(72) Inventors: Terrill B. Atwater, Bel Air, MD (US); Yakira J. Howarth, Baltimore, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 1164 days.

(21) Appl. No.: 15/724,255

(22) Filed: Oct. 3, 2017

(65) Prior Publication Data

US 2019/0100442 A1 Apr. 4, 2019

(51) Int. Cl.
*H01M 10/0525* (2010.01)
*H01M 4/131* (2010.01)
*H01M 4/525* (2010.01)
*H01M 4/505* (2010.01)
*H01M 4/1391* (2010.01)
(Continued)

(52) U.S. Cl.
CPC .......... *C01G 53/52* (2013.01); *C01G 49/0072* (2013.01); *C01G 51/52* (2013.01); *H01M 4/131* (2013.01); *H01M 4/1391* (2013.01); *H01M 4/505* (2013.01); *H01M 4/525* (2013.01); *H01M 4/623* (2013.01); *H01M 4/625* (2013.01); *H01M 10/0525* (2013.01); *C01P 2002/32* (2013.01); *C01P 2002/50* (2013.01);
(Continued)

(58) Field of Classification Search
None
See application file for complete search history.

(56) References Cited

U.S. PATENT DOCUMENTS 5,478,671 A * 12/1995 Idota ................... H01M 4/131
429/221
6,770,398 B1 * 8/2004 Atwater .............. H01M 4/505
429/224
(Continued)

*Primary Examiner* — Barbara L Gilliam
*Assistant Examiner* — Helen M McDermott
(74) *Attorney, Agent, or Firm* — Kirsten Hiera

(57) ABSTRACT

A process for preparing a stable $Li_xK_yMn_{2-z}Me_zO_4$ is provided. The general formula of the potassium "A" site and Group VIII Period 4 (Fe, Co and Ni) "B" site modified lithium manganese-based $AB_2O_4$ spinel is $Li_xK_yMn_{2-z}Me_zO_4$ where Me is Fe, Co, or Ni. In addition, a $Li_xK_yMn_{2-z}Me_zO_4$ cathode material for electrochemical systems is provided. Furthermore, a lithium or lithium-ion rechargeable electrochemical cell is provided, incorporating the $Li_xK_yMn_{2-z}Me_zO_4$ cathode material in a positive electrode.

20 Claims, 22 Drawing Sheets

(51) Int. Cl.
- *C01G 53/00* (2006.01)
- *C01G 51/00* (2006.01)
- *H01M 4/62* (2006.01)
- *C01G 49/00* (2006.01)
- *H01M 4/02* (2006.01)

(52) U.S. Cl.
CPC ...... *C01P 2002/72* (2013.01); *C01P 2006/40* (2013.01); *H01M 2004/028* (2013.01); *Y02E 60/10* (2013.01)

(56) References Cited

U.S. PATENT DOCUMENTS

| | | | | |
|---|---|---|---|---|
| 2007/0122703 | A1* | 5/2007 | Whitfield | C01G 45/1228 429/224 |
| 2010/0086853 | A1* | 4/2010 | Venkatachalam | H01M 4/362 429/223 |
| 2014/0034872 | A1* | 2/2014 | Watanabe | C01G 45/1242 252/182.1 |

* cited by examiner

STABILIZED LITHIUM, MANGANESE $AB_2O_4$ SPINEL FOR RECHARGEABLE LITHIUM ELECTROCHEMICAL SYSTEMS THROUGH A AND B SITE DOPING, METHOD OF PREPARING THE SAME, AND LI ELECTROCHEMICAL CELL CONTAINING THE SAME

GOVERNMENT INTEREST

The invention described herein may be manufactured, used, imported, sold, and licensed by or for the Government of the United States of America without the payment of any royalty thereon or therefor.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium-ion batteries must be fully reversible in order to have a commercially viable cell. These electrochemical systems include manganese-based lithium metal oxides configured in lithium, lithium-ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCo_zO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as a cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading.

$MnO_2$ exists in several phases or crystal structures. These forms include a lithiated spinel ($Li_xMn_2O_4$) and its different structures denoted by $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. $\beta$-$MnO_2$ is a tetragonal structure with the lattice containing one by one channels for lithium insertion/extraction. $\gamma$-$MnO_2$ is also one-dimensional, existing in both hexagonal and orthorhombic crystal structures with a lattice that contains one by two channels for lithium insertion/extraction. Because of their stability $\alpha$-$MnO_2$, $\beta$-$MnO_2$, and $\gamma$-$MnO_2$ are not considered rechargeable. However, cycling of lithium into the $\alpha$-$MnO_2$, $\beta$-$MnO_2$, and $\gamma$-$MnO_2$ lattice can be achieved with rigid stoichiometric control.

$\lambda$-$MnO_2$ is considered the conventional $MnO_2$ based cathode material for rechargeable lithium electrochemical systems. $\lambda$-$MnO_2$ is created through the delithiation of $Li_xMn_2O_4$ $AB_2O_4$ spinel. The $\lambda$-$MnO_2$ crystal structure is maintained through both charge and discharge of the $LiMn_2O_4$ spinel. The maintenance of the $\lambda$-$MnO_2$ structure during insertion and extraction of lithium in the $Li_xMn_2O_4$ spinel makes it an attractive couple with lithium for rechargeable electrochemical systems. The $\lambda$-$MnO_2$ crystal structure is a three dimensional cubic array. This crystal structure promotes mechanical stability and adequate pathways for lithium insertion/extraction. Degradation of the $\lambda$-$MnO_2$ crystal structure forming $\alpha$, $\beta$, or $\gamma$-$MnO_2$ crystals and other $Mn_xO_y$ phases reduces the capacity of the cathode material.

$Li_xMn_2O_4$ forms a three-dimensional spinel structure where manganese occupies the octahedral sites and lithium occupies the tetrahedral sites. In the $AB_2O_4$ spinel structure, lithium has the valence state of 1+ in the 8a or A sites, while the manganese has a mixture of 3+ and 4+ ions in the 16d or B sites.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeletal crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can impede lithium mobility. As a result of these phase changes, unwanted crystal structures develop that are either too stable for electrochemical reactions or block the insertion/extraction paths of lithium cations into the cathode material. This general phenomenon is regarded as the major contributor to capacity fading.

As lithium intercalates, the size and orientation of the crystal structures change. In $Li_xMn_2O_4$ spinel materials, when $0.05<x<1$, the crystal structure is cubic ($\lambda$-$MnO2$). When $1<x<1.8$, the structure of $Li_xMn_2O_4$ (no longer a $AB_2O_4$ spinel) is tetragonal. Additionally, when $x<0.05$, a phase transition to the more stable $\alpha$, $\beta$, and $\gamma$ $MnO_2$ can occur. Continued charge and discharge promotes the transformation of the cubic crystal structure to other cubic, tetragonal, and monoclinic phases. Tetragonal and monoclinic crystal structures may become inactive leading to the loss of active cathode material.

Voltage control, maintaining $0.05<x<1$, allows for the mitigation of the formation of unwanted crystal structures. When the potential of the lithium/$Li_xMn_2O_4$ electrochemical system is maintained between 3.0 and 4.25 volts, the cubic phase is maintained. Once the potential of the system drops below 3.0 volts the $Li_xMn_2O_4$ cathode material undergoes a phase change from cubic to tetragonal. When the potential of the system increases above 4.25 volts, the $Li_xMn_2O_4$ cathode material becomes stripped of the lithium component and undergoes a phase change from cubic ($\lambda$-$MnO_2$) to the more stable $\alpha$, $\beta$ and/or $\gamma$ $MnO_2$.

When the electrochemical cell is charged, lithium cations are removed from the lattice according to the reversible reaction $LiMn_2O_4 \leftrightarrows Li_xMn_2O_4 + (1-x)Li^+ + (1-x)e^-$, where the manganese undergoes oxidation to the higher 4+ valence state. Once fully charged, this stable valence state allows for the insertion of lithium into the lattice during discharge, where the valence state of manganese is again lowered. However, due to nonequilibrium conditions, where x locally increases to >1, the effect of shuttling lithium ions between the positive and negative electrodes during cycling creates phase transitions that alter the overall crystal structure of the spinel.

Repeatedly inserting lithium cations into the spinel structure during discharge both mechanically expands the lattice and forces its transition from the cubic phase to the less stable tetragonal phase. This can result in irreversible mechanical strain on the expanded skeletal structure as well as Jahn-Teller distortion of $Mn^{3+}$ ions in the octahedral B sites. Both of these factors have been determined to contribute to capacity fading of the $LiMn_2O_4$ electrode.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material as a result of both changes in the composition and crystal. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additionally an external influence, such as elevated temperature, can also promote cathode fracture. In this case structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Other phase transitions that lead to capacity fading include the formation of $Mn_2O_3$ and $Mn_3O_4$. The $Mn_2O_3$ and $Mn_3O_4$ formations result from the liberation of oxygen in the $MnO_2$ and $Mn_2O_4$ structures. The valence state of manganese in these structures is 3+ or less. This lower valence state creates a stable crystal structure that is not conducive to lithium intercalation and, therefore, not rechargeable. As more $Mn_2O_3$ and $Mn_3O_4$ are formed, less $MnO_2$ and $Mn_2O_4$ remain and the usefulness of the cathode decreases.

Thus, one of the disadvantages of conventional lithium manganese-based $AB_2O_4$ spinel materials is the limited cycle life and limited rate capability for lithium electrochemical systems. Furthermore, this problem is a major obstacle for rechargeable lithium battery technology. An additional limiting factor for lithium manganese-based $AB_2O_4$ spinel materials is the time required to process the raw materials and synthesize the desired product; conventional methods require multiple mixing, grinding and calcining steps, which takes days to complete.

SUMMARY OF THE INVENTION

The present disclosure resolves the aforementioned problems with rate capability and limited cycle life associated with conventional lithium manganese-based $AB_2O_4$ spinel cathode materials in lithium electrochemical systems and rechargeable lithium electrochemical systems. The present disclosure provides a stabilized lithium manganese-based $AB_2O_4$ spinel material with potassium "A" site and Group VIII Period 4 (Fe, Co and Ni) "B" site modifications. "A" site modification describes substituting an alternative element on the "A" site of the $AB_2O_4$ spinel, while "B" site modification describes substituting an alternative element on the "B" site of the $AB_2O_4$. The present potassium "A" site and Group VIII Period 4 (Fe, Co and Ni) "B" site modified lithium manganese-based $AB_2O_4$ spinel materials, when used in a lithium or lithium-ion electrochemical cell, demonstrate improved rate tolerance and enhanced cycle life over conventional $LiMn_2O_4$ lithium battery cathode material.

More specifically, the present $Li/Li_xK_yMn_{2-z}Me_zO_4$ (where Me is Fe, Co or Ni) electrochemical cells exhibit increased high rate durability that allows the cathode to be fully reversible at elevated charge and discharge rates while displaying resiliency across the voltage ranges from 5.25 to 2.0, 5.2 to 2.0, or 5.0 V to 2.0 V in $Li_xK_yMn_{2-z}Me_zO_4$ material of the present disclosure. The present $Li/Li_xK_yMn_{2-z}Me_zO_4$ electrochemical cells meet other significant lithium battery operational objectives (e.g., low impedance, thermal stability, longer life cycle, and over-discharge protection).

Additionally, in order to prevent cathodic capacity fading during over charge conditions, "A" site doping allows for the retention of the cubic phase of the $AB_2O_4$ spinel. This is achieved by maintaining the "A" site presence in the material with potassium as lithium is extracted from the cathode material during charging. By retaining an "A" site presence, the phase change of the remaining $MnO_x$ to the tetragonal or monoclinic phases is mitigated due to an incomplete conversion of the manganese from a $Mn^{3+}$ valence to a $Mn^{4+}$ valence.

In one embodiment, a method of preparing a homogeneously dispersed potassium-modified lithium manganese-based $AB_2O_4$ spinel cathode material of the formula $Li_xK_yMn_{2-z}Me_zO_4$ includes mixing a manganese source and a Group VIII Period 4 source to form a first mixture. The first mixture is calcined to produce a manganese mixed metal-based metal oxide. Then, the manganese mixed metal-based metal oxide, a lithium source, and a potassium source are mixed to produce a second mixture. The second mixture is calcined to produce the homogeneously dispersed potassium-modified lithium manganese-based $Li_xK_yMn_{2-z}Me_zO_4$ spinel cathode material.

In another embodiment, a homogeneously dispersed potassium-modified lithium manganese-based $Li_xK_yMn_{2-z}Me_zO_4$ spinel cathode material is disclosed using the aforementioned method. In yet another embodiment, the present disclosure provides a lithium electrochemical cell that includes an anode and a cathode including the present homogeneously dispersed potassium-modified lithium manganese-based $Li_xK_yMn_{2-z}Me_zO_4$ spinel cathode material using the aforementioned method.

BRIEF DESCRIPTION OF THE DRAWINGS

The accompanying drawings, which are included to provide further understanding of the present disclosure, and are incorporated in and constitute a part of the specification, illustrate exemplary embodiments of the present disclosure, and together with the description serve to explain the principles of the present disclosure. The present disclosure will now be described further with reference to the accompanying drawings as follows.

DETAILED DESCRIPTION

Figure 1:
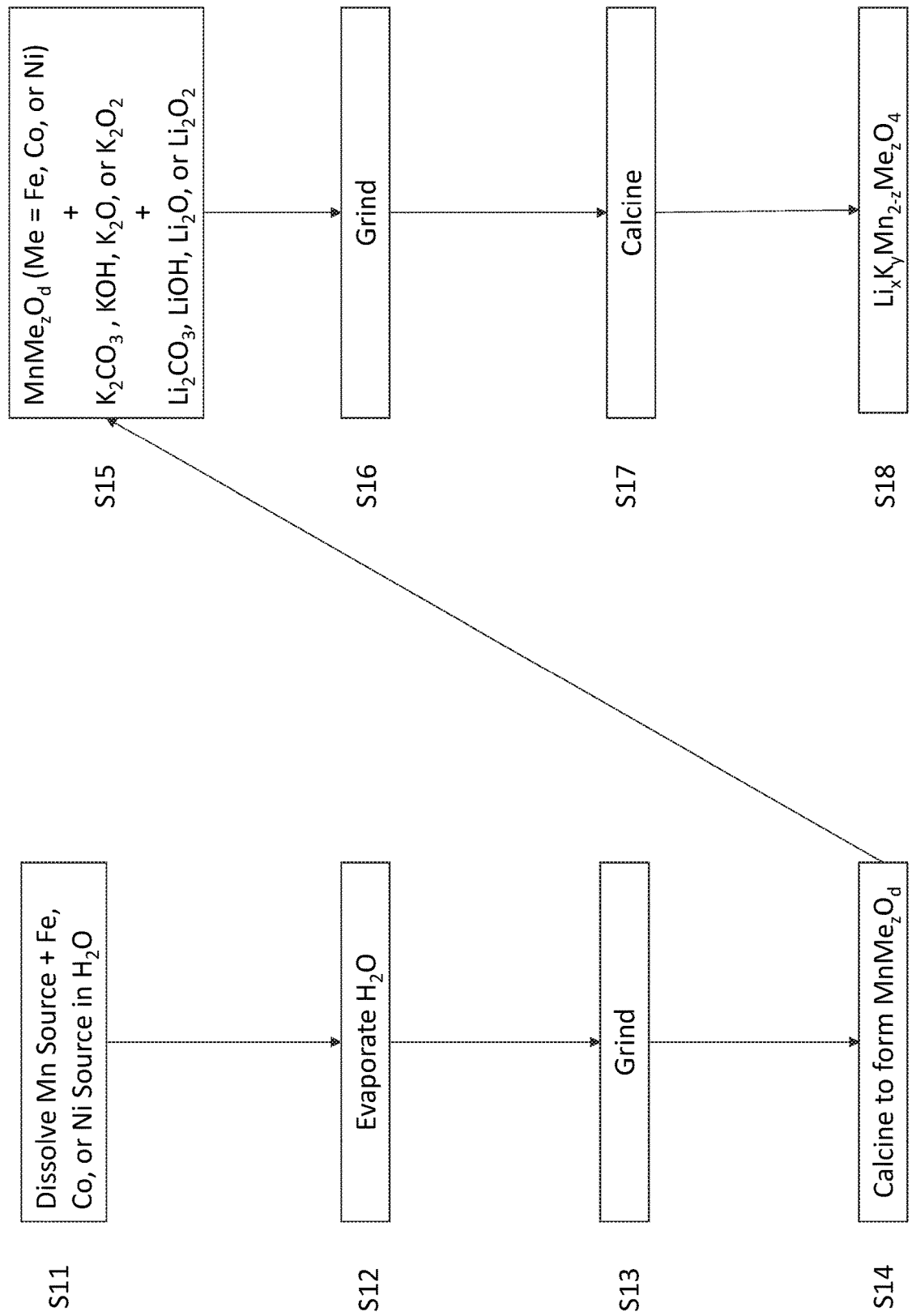
FIG. 1 is a flowchart illustrating process steps in an exemplary embodiment of the present disclosure.

The present disclosure provides a method of preparing the aforementioned potassium "A" site and Group VIII Period 4 (Fe, Co and Ni) "B" site modified lithium manganese-based $AB_2O_4$ spinel cathode material via a multi-step method comprising an initial precursor synthesis of a manganese mixed metal oxide through hydrothermal synthesis or nitrate flame synthesis, followed by a solid state reaction with the precursor and alkali compounds.

In this embodiment, a stable lithium manganese-based $AB_2O_4$ spinel material is synthesized using a solid state synthesis process where a precursor mixed metal oxide is synthesized through a hydrothermal or a nitrate flame process and calcined, producing a $Li_xK_yMn_{2-z}Me_zO_4$ where Me is Fe, Co or Ni, cathode material that may be employed as a positive electrode for lithium and lithium-ion rechargeable electrochemical cells and batteries. The general formula for the material is $Li_xK_yMn_{2-z}Me_zO_4$ for lithium and lithium-ion electrochemical couples, where x=0.05 to 1.95, y=0.05 to 0.2, and z=0.005 to 0.6; or where x=0.75 to 1.25, y=0.0 to 0.25, and z=0.0 to 0.6; or where x=0.95 to 1.15, y=0.09 to 0.125, and z=0.0 to 0.6. Me is a Group VIII Period 4 element (iron, cobalt or nickel) and the reversible region for x for the $Li/Li_xK_yMn_{2-z}Me_zO_4$ electrochemical couple ranges from 0.05 to 1.9.

One aspect of this embodiment includes dissolving manganese acetate and a Group VIII Period 4 element (iron, cobalt or nickel) acetate in water, initiating a hydrothermal synthesis process. Once dissolved, ammonium hydroxide is added to form a gel. The gel is then dried (which can be accomplished in a drying oven) and calcined in air at a temperature of at least 300° C. for a maximum of 2 hours. Suitable calcination temperatures and times include (but are not limited to) 300° C. to 450° C. (for 0.5 to 2 hours), from 350° C. to 450° C. (for 0.5 to 1 hour), or from 350° C. to 400° C. (for 1 to 2 hours). The results of the hydrothermal synthesis is a $MnMeO_x$ mixed metal oxide compound. The $MnMeO_x$ compound is then mixed with a lithium containing salt. Suitable lithium containing salts include, include (but are not limited to) lithium carbonate, lithium hydroxide, lithium oxide, and lithium peroxide, and a potassium containing salt. Suitable potassium containing salts include (but are not limited to) potassium carbonate, potassium hydroxide, potassium oxide, and potassium peroxide. This mixture is then calcined at a temperature of at least 600° C. for at least 12 hours to produce a potassium "A" site and Group VIII Period 4 (Fe, Co and Ni) "B" site modified lithium manganese-based $AB_2O_4$ spinel cathode material. Suitable calcination temperatures and times include (but are not limited to) 600° C. to 1200° C. (for 12 to 72 hours), from 800° C. to 1200° C. (for 12 to 48 hours), or from 600° C. to 800° C. (for 24 to 72 hours).

In another aspect of this embodiment, a method of preparing a homogeneous $Li_xK_yMn_{2-z}Me_zO_4$ lithium manganese-based $AB_2O_4$ spinel cathode material includes dissolving the option of a nitrate of a Group VIII Period 4 element, and a manganese nitrate to form an aqueous solution. Then, the aqueous solution is mixed with a chelating agent to produce a mixture. Suitable chelating agents include (but are not limited to) glycine, cellulose, citric acid, a cellulose-citric acid mixture, and urea. The mixture is then heated to produce an ash, and the ash is ground. Then, the ground ash is calcined for a time period no greater than 4 hours at a temperature of at least 350° C. (for example, at 350° C. to 800° C. (for 1 to 4 hours), at 400° C. to 600° C. (for 1.5 to 3 hours), or at 500° C. to 600° C. (for 2 to 2.5 hours)) to produce the Group VIII Period 4 element-doped manganese oxide precursor, which is then mixed with a lithium containing salt and a potassium containing salt. This mixture is then calcined at at least 600° C. for at least 12 hours to produce a potassium "A" site and Group VIII Period 4 (Fe, Co and Ni) "B" site modified lithium manganese-based $AB_2O_4$ spinel cathode material. Suitable calcination temperatures and times include (but are not limited to) 600° C. to 1200° C. (for 12 to 72 hours), from 800° C. to 1200° C. (for 12 to 48 hours), or from 600° C. to 800° C. (for 24 to 72 hours).

FIG. 1 is a flowchart illustrating process steps in an exemplary embodiment of the present disclosure. More specifically, FIG. 1 shows exemplary steps according to the present disclosure for the preparation of $Li_xK_yMn_{2-z}Me_zO_4$, where Me is Fe, Co or Ni and where an intermediate manganese mixed metal based metal oxide is formulated.

In Step S11, a manganese source and an iron, cobalt, or nickel source are dissolved in water. In Step S12, the water in the mixture is evaporated. In Step S13, the residual is ground to form a product. In Step S14, product is calcined to form the mixed metal based metal oxide, $MnMe_zO_d$. In Step S15, the $MnMe_zO_d$ is mixed with a potassium source such as potassium carbonate, potassium hydroxide, potassium peroxide, or potassium oxide, and with a lithium source such as lithium carbonate, lithium hydroxide, lithium peroxide, or lithium oxide. The mixture is then ground in Step S16. In Step S17 the material is calcined to form the $Li_xK_yMn_{2-z}Me_zO_4$ in Step S18.

Figure 2:
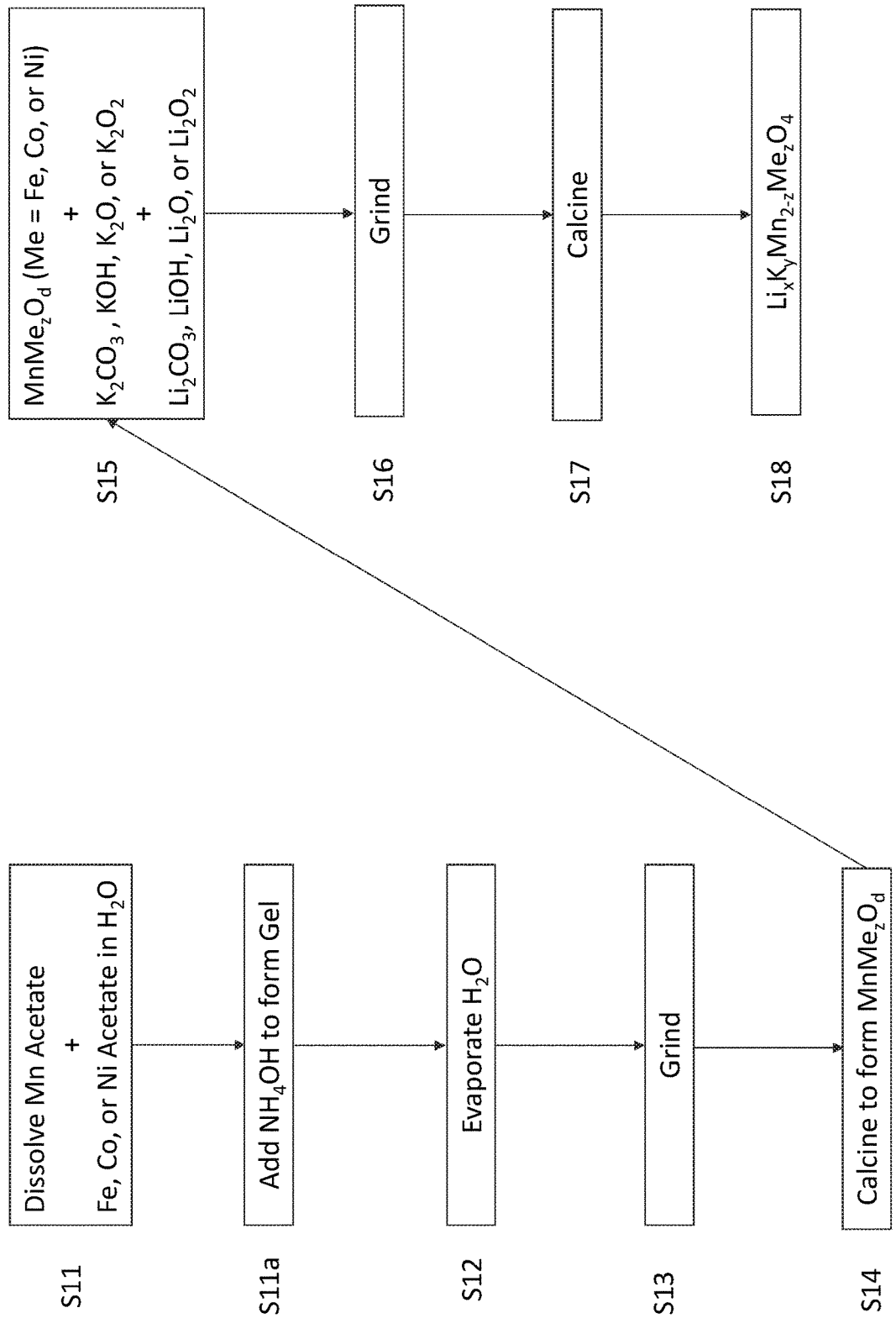
FIG. 2 is a flowchart illustrating process steps describing one aspect of the embodiment. These process steps include hydrothermal preparation of the $Mn_{2-z}Me_zO_x$ intermediate followed by a solid state reaction forming the desired $Li_xK_yMn_{2-z}Me_zO_4$ material, where Me is Fe, Co or Ni.

FIG. 2 describes one aspect of an embodiment of the process. In this aspect, the intermediate manganese mixed metal based metal oxide is formulated through a hydrothermal process, followed by a solid state milling and calcining process. In this aspect, in Step S11, the manganese source referred to in S11 of FIG. 1 is manganese acetate. The iron, cobalt, or nickel source is iron acetate, cobalt acetate, or nickel acetate. The manganese source and the iron, cobalt, or nickel source may be reacted in stoichiometric ratio. The water used to dissolve the reactants can be distilled water. Ammonium hydroxide is added in Step S11a to the aqueous metal acetate solution to form a gel.

In Step S12, the water is evaporated, drying the gel to form a residual. In Step S13, the residual is ground. In Step S14, the ground residual is calcined in air at a temperature of at least 300° C. for a maximum of 2 hours to form a manganese mixed metal oxide. Suitable calcination temperatures and times include (but are not limited to) calcining at 300° C. to 450° C. (for 0.5 to 2 hours), 350° C. to 450° C. (for 0.5 to 1 hour), or 350° C. to 400° C. (for 1 to 2 hours).

In Step S15, the resultant manganese mixed metal oxide from Step S14 is mixed with lithium hydroxide and potassium hydroxide. Lithium carbonate, lithium oxide, or lithium peroxide may be substituted for lithium hydroxide in Step S15. Potassium carbonate, potassium oxide, or potassium peroxide can be substituted for potassium hydroxide in Step S15. In Step S16, the mixture is ground. A high energy mixer mill may be used to accomplish the grinding step. The ground mixture from Step S16 is then calcined in Step S17 in a furnace at at least 600° C. for at least 12 hours. Alternatively, suitable calcination temperatures and times include calcining at 600° C. to 1200° C. (for 12 to 72 hours), at 800° C. to 1200° C. (for 12 to 48 hours), or at 600° C. to 800° C. (for 24 to 72 hours).

In Step S18, the resulting "A" and "B" site modified $Li_xK_yMn_{2-z}Me_zO_4$ yields material with x ranging from 0.05 to 1.95, y=0.05 to 0.2, and z=0.005 to 0.6. Alternative ranges include x=0.75 to 1.25, y=0.0 to 0.25, and z=0.0 to 0.6, as well as x=0.95 to 1.15, y=0.09 to 0.125, and z=0.0 to 0.6.

Figure 3:
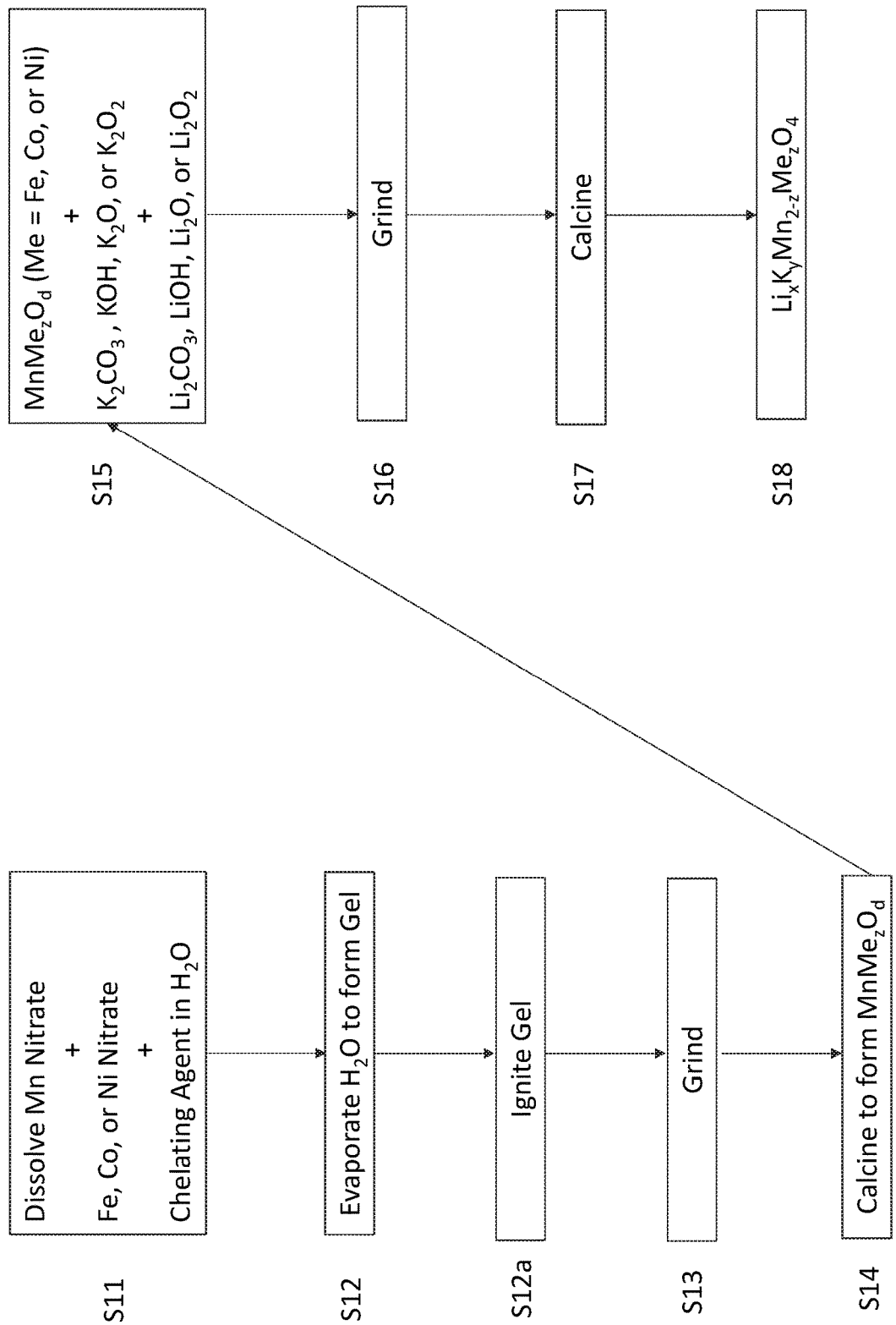
FIG. 3 is a flowchart illustrating process steps in another aspect of the exemplary embodiment of the present disclosure. These process steps include glycine nitrate flame preparation of the $Mn_{2-z}Me_zO_x$ intermediate followed by a solid state reaction forming the desired $Li_xK_yMn_{2-z}Me_zO_4$ material, where Me is Fe, Co or Ni.

FIG. 3 describes another aspect of an embodiment of this process. In this aspect, the intermediate manganese mixed metal based metal oxide is formulated via a method comprising an initial flame synthesis process producing an intermediate mixed metal oxide followed by Steps S15-S18 of FIG. 1, which are described above. In this embodiment, in Step S11, the manganese source is manganese nitrate; the iron, cobalt, or nickel source is iron nitrate, cobalt nitrate, or nickel nitrate; and a chelating agent is added to the aqueous mixture. Suitable chelating agents include (but are not limited to) glycine, cellulose, citric acid, a cellulose-citric acid mixture, and urea. In Step S12, the water in the mixture is evaporated to form a gel, the gel is ignited in Step S12a to form a residual. In Step S13, the residual is ground. In Step S14, the ground dried ash is calcined in air for a time period no greater than 4 hours at a temperature of at least 350° C. (for example, at 350° C. to 800° C. (for 1 to 4 hours), at 400° C. to 600° C. (for 1.5 to 3 hours), or at 500° C. to 600° C. (for 2 to 2.5 hours)) to form a manganese mixed metal oxide. Steps S15-S18 of FIG. 1 (described above) are then followed to yield the resulting "A" and "B" site modified $Li_xK_yMn_{2-z}Me_zO_4$ yields material with x ranging from 0.05 to 1.95, y=0.05 to 0.2, and z=0.005 to 0.6. Alternative ranges include x=0.75 to 1.25, y=0.0 to 0.25, and z=0.0 to 0.6, as well as x=0.95 to 1.15, y=0.09 to 0.125, and z=0.0 to 0.6.

Figure 4:
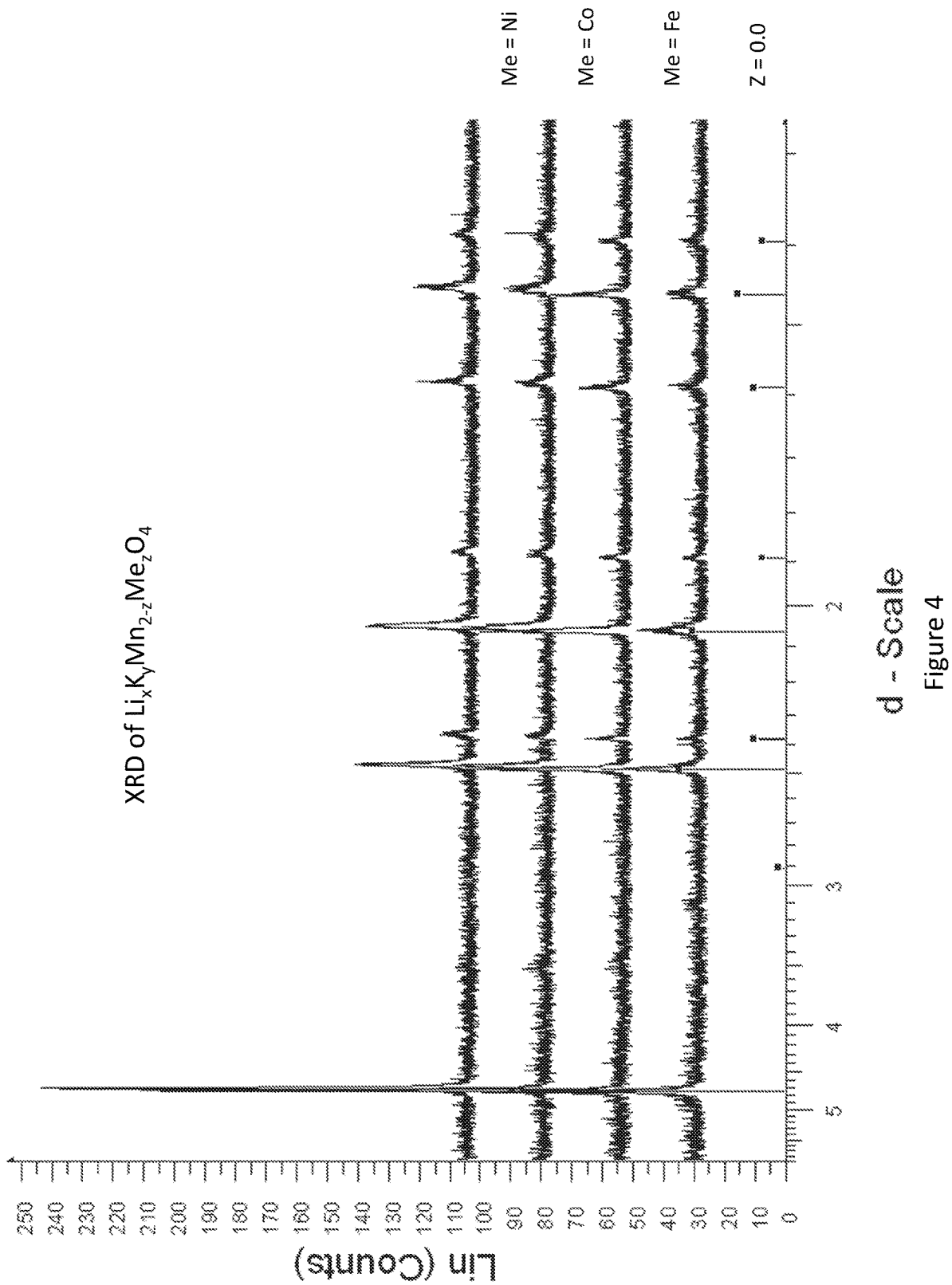
FIG. 4 is a graph showing x-ray diffraction data for an exemplary formulation mixture according to exemplary embodiments of the present disclosure compared to the standard data for intensity and location for a $LiMn_2O_4$ spinel.

FIG. 4 shows the X-ray diffraction pattern of exemplary formulation mixtures according to exemplary embodiments of the present disclosure compared to the standard data for intensity and location from the International Center for Diffraction Data for $LiMn_2O_4$ spinel (JCPDS catalog number 018-0736). The figures show the X-ray diffraction pattern for $Li_xK_yMn_{2-z}Me_zO_4$ material, where Me is Fe, Co or Ni, according to the present disclosure.

Figure 5:
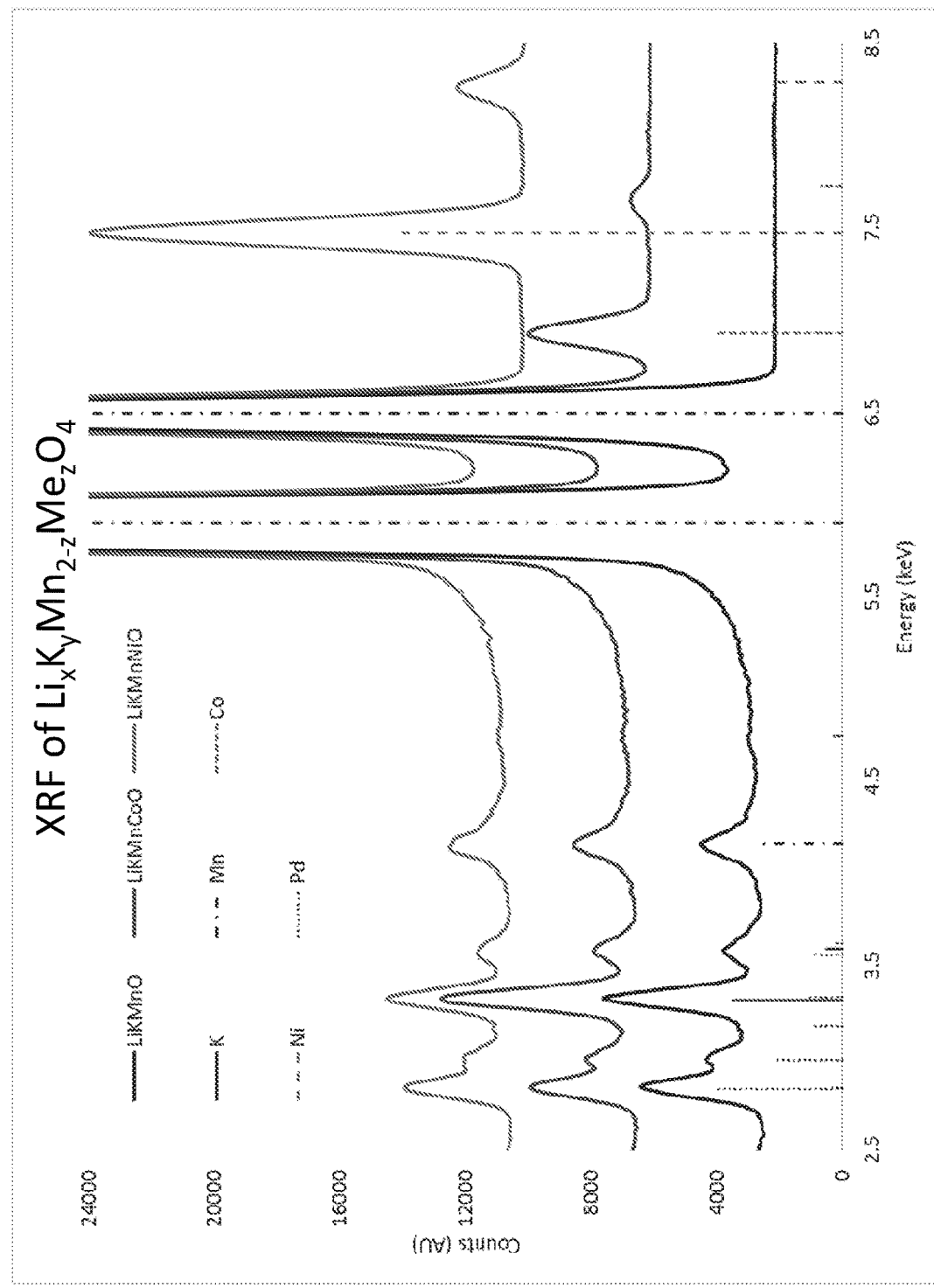
FIG. 5 is a graph showing x-ray fluorescence data for an exemplary formulation mixture according to exemplary embodiments of the present disclosure compared to known references K, Mn, Co, Ni, and Pd. For this graph, the traces represent z=0, Me=Co and Me=Ni.

FIG. 5 shows the X-ray fluorescence pattern of exemplary formulation mixtures according to exemplary embodiments of the present disclosure compared to reference standards K, Mn, Co, Ni, and Pd. The figure shows the X-ray diffraction pattern for $Li_xK_yMn_{2-z}Me_zO_4$ where Me is absent, Co or Ni material according to the present disclosure.

Figure 6:
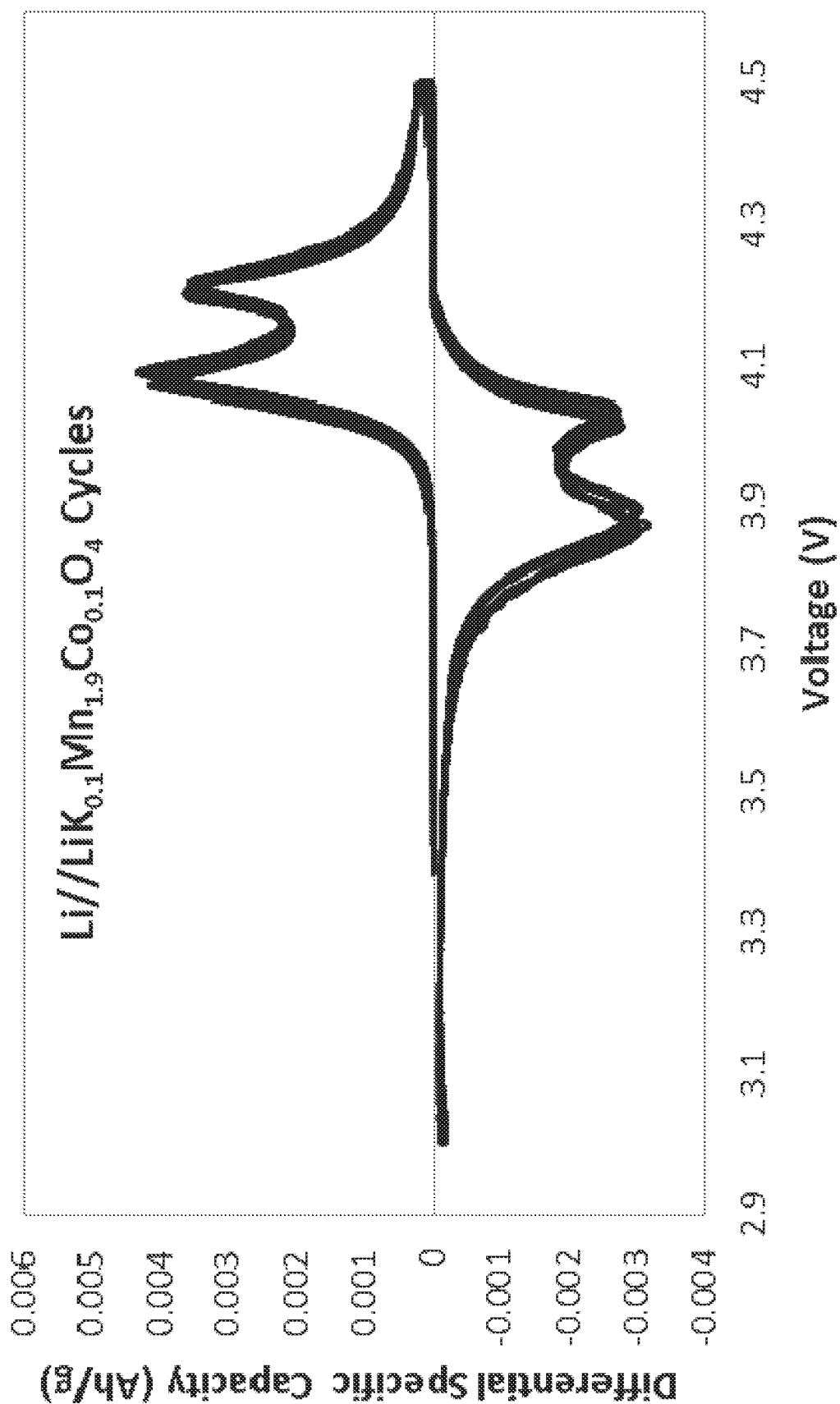
FIG. 6 is a graph of differential specific capacity at a 2.0 mA charge and discharge rate illustrating a lithium cell containing stabilized lithium manganese-based $AB_2O_4$ spinel cathode with potassium doped "A" site and cobalt doped "B" site modifications according to an exemplary embodiment of the present disclosure.
Figure 7:
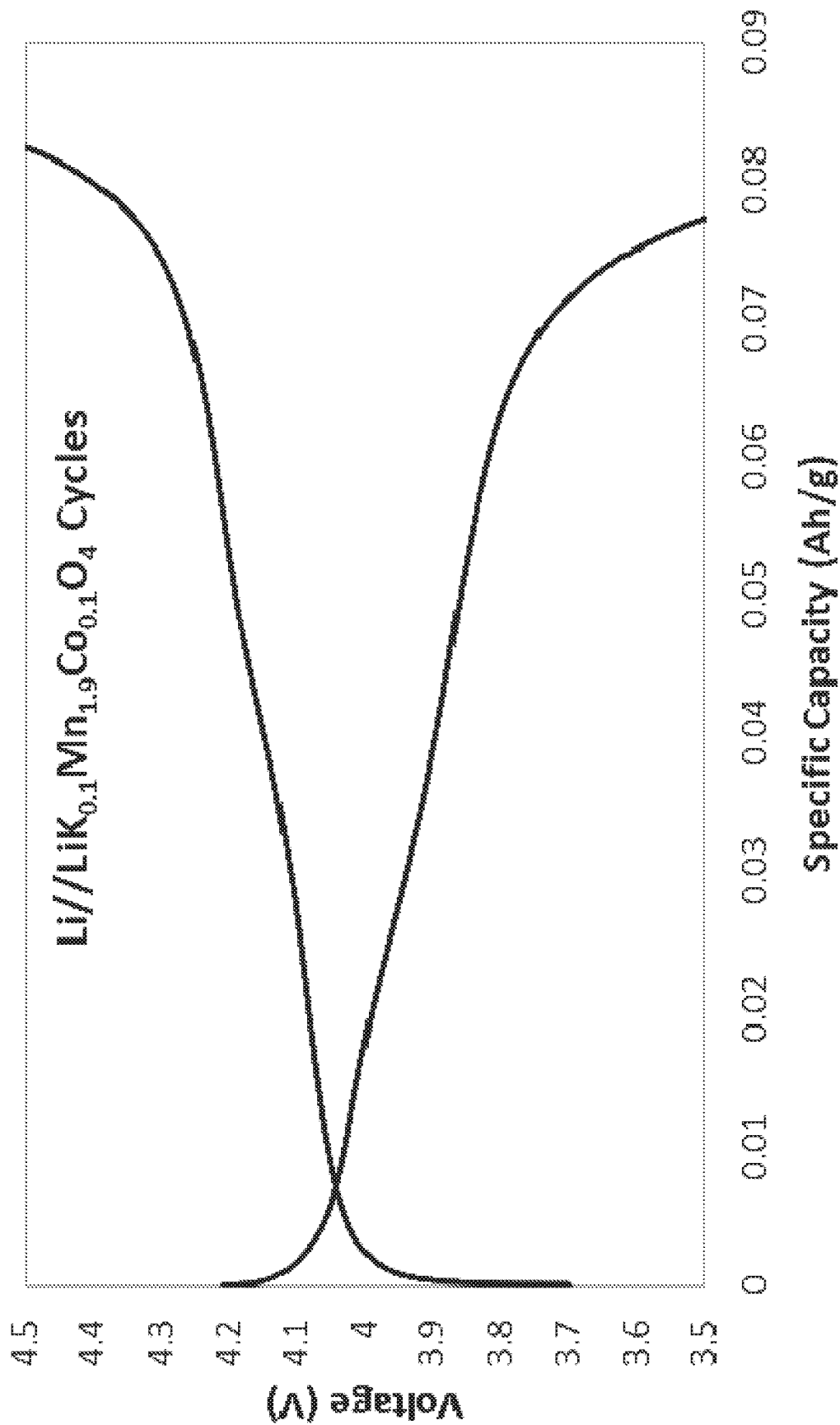
FIG. 7 is a graph of charge and discharge curves at a 2.0 mA charge and discharge rate illustrating a lithium cell containing stabilized lithium manganese-based $AB_2O_4$ spinel cathode with potassium doped "A" site and cobalt doped "B" site modifications according to an exemplary embodiment of the present disclosure.

FIGS. 6 and 7 show the differential capacity and galvanostatic (charge/discharge) plots for lithium electrochemical cell 1, which was fabricated with $Li_xK_yMn_{2-z}Co_zO_4$ where x=1, y=0.1, and z=0.2 synthesized using the method described in the present disclosure. In lithium electrochemical cells, the active material is bound to an aluminum current collector with either Teflon or pVdF mixed with conductive carbon. The conductive carbon serves as an aid for electron transfer. The experimental cells were composed of a lithium anode separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xK_yMn_{2-z}Me_zO_4$, carbon, and Teflon in a 75:15:10 weight percent basis, respectively. Suitable conductive carbon materials include, but are not limited to, conductive carbon black (commercially available from various sources, including Cabot Corporation, under the trade name VULCAN XC72 or VULCAN XC72R), graphite, carbon nanofibers, and carbon nanoparticles (commercially available under the trade name PURE BLACK, manufactured by Superior Graphite Co.). Suitable binders include, but are not limited to, polytetrafluoroethylene (commercially available under the trade name TEFLON, manufactured by DuPont), polyvinylidene fluoride (PVDF), and latex. The cathode may contain by weight 40%-95% of $Li_xK_yMn_{2-z}Me_zO_4$, 1%-40% of conductive carbon, and 1%-20% binder.

The cathode mix was rolled to 0.06 cm and dried in a vacuum oven. The cathode mass was approximately 0.1 g. The cathode and 0.075 cm thick lithium foil was cut using a 1.58 cm diameter (1.96 $cm^2$) hole punch. A 0.01 cm nonwoven glass separator was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The cells were cycled with an ARBIN Model MSTAT4 Battery Test System. The charge profile consisted of a constant current charge at 1.0 or 2.0 mA to 4.5, 4.75, 5.0 or 5.2 volts. The cells were discharged at 1.0 or 2.0 mA to 2.0, 2.25 or 3.5 volts. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The cell was cycled between 4.5 to 3.5 V at a charge and discharge rate of 2 mA. Differential capacity traces provide information regarding the underlying thermodynamics and kinetics of an electrochemical cell. The differential capacity data use galvanostatic control of the electrochemical system being tested, and plots the capacity increase (charge) or decrease (discharge) as a function of potential. FIG. 6 illustrates the reproducible thermodynamics of the $Li_xK_yMn_{2-z}Co_zO_4$ chemistry where x=1, y=0.1, and z=0.2 over repeated cycles. FIG. 7 illustrates a select charge and discharge curve.

Figure 8:
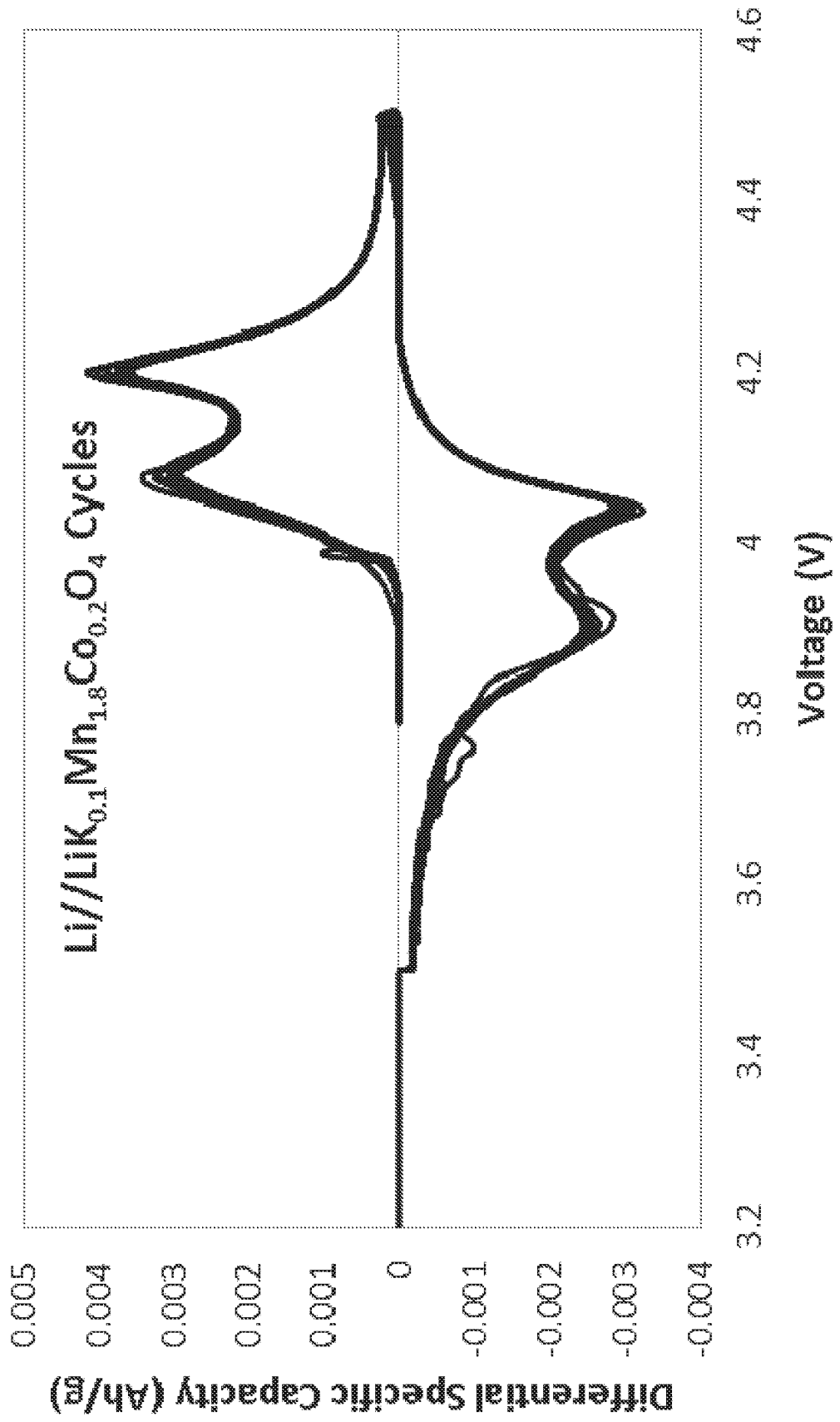
FIG. 8 is a graph of differential specific capacity at a 2.0 mA charge and discharge rate illustrating a lithium cell containing stabilized lithium manganese-based $AB_2O_4$ spinel cathode with potassium doped "A" site and cobalt doped "B" site modifications according to an exemplary embodiment of the present disclosure.
Figure 9:
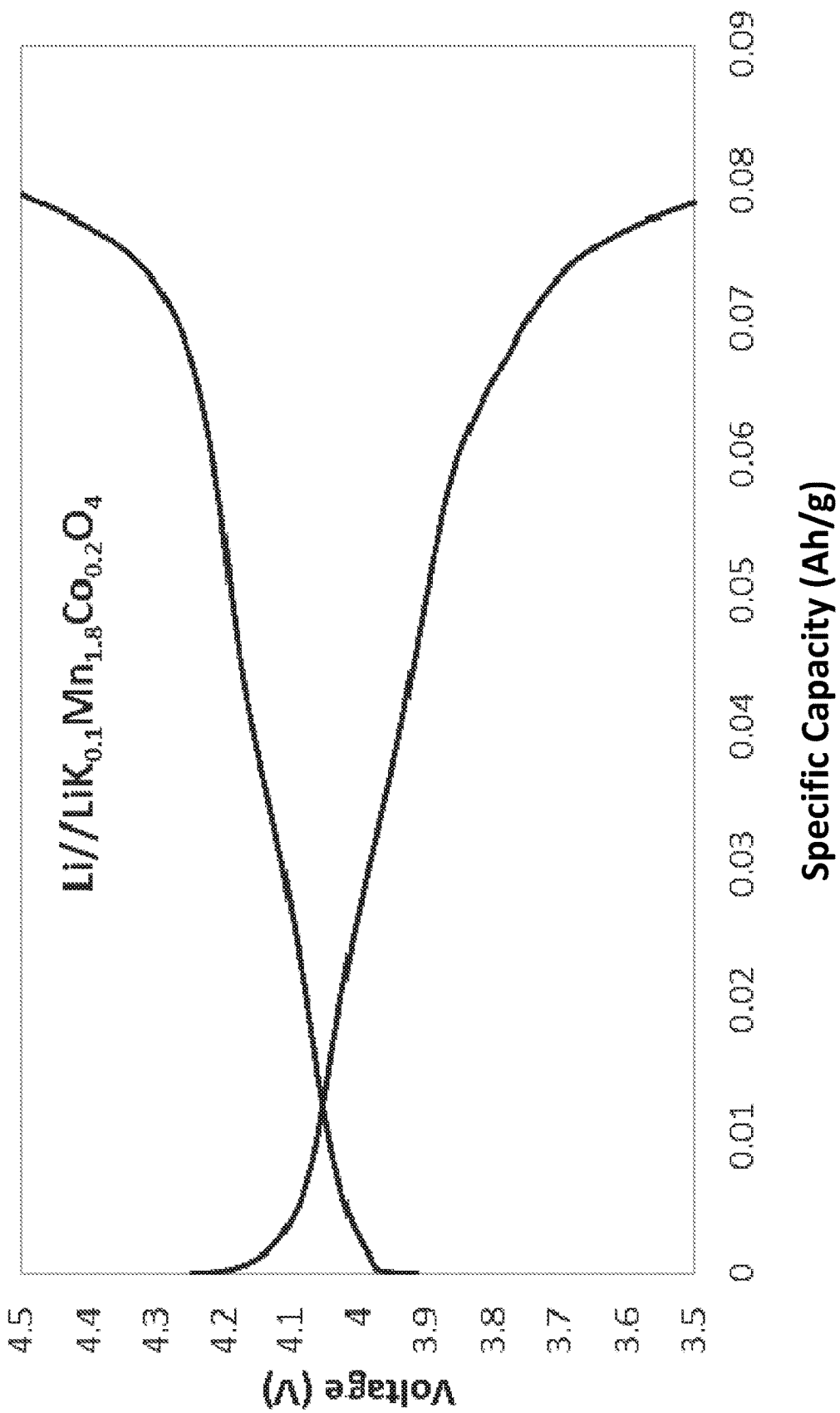
FIG. 9 is a graph of charge and discharge curves at a 2.0 mA charge and discharge rate illustrating a lithium cell containing stabilized lithium manganese-based $AB_2O_4$ spinel cathode with potassium doped "A" site and cobalt doped "B" site modifications according to an exemplary embodiment of the present disclosure.

FIGS. 8 and 9 show the differential capacity and galvanostatic (charge/discharge) plots for lithium electrochemical cell 2, which was fabricated with $Li_xK_yMn_{2-z}Co_zO_4$ where x=1, y=0.1, and z=0.1 synthesized using the method described in the present disclosure. The cell was cycled between 4.5 to 3.5 V at a charge and discharge rate of 2 mA. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. FIG. 8 illustrates the reproducible thermodynamics of the $Li_xK_yMn_{2-z}Co_zO_4$ chemistry where x=1, y=0.1, and z=0.1 over repeated cycles. FIG. 9 illustrates a select charge and discharge curve.

Figure 10:
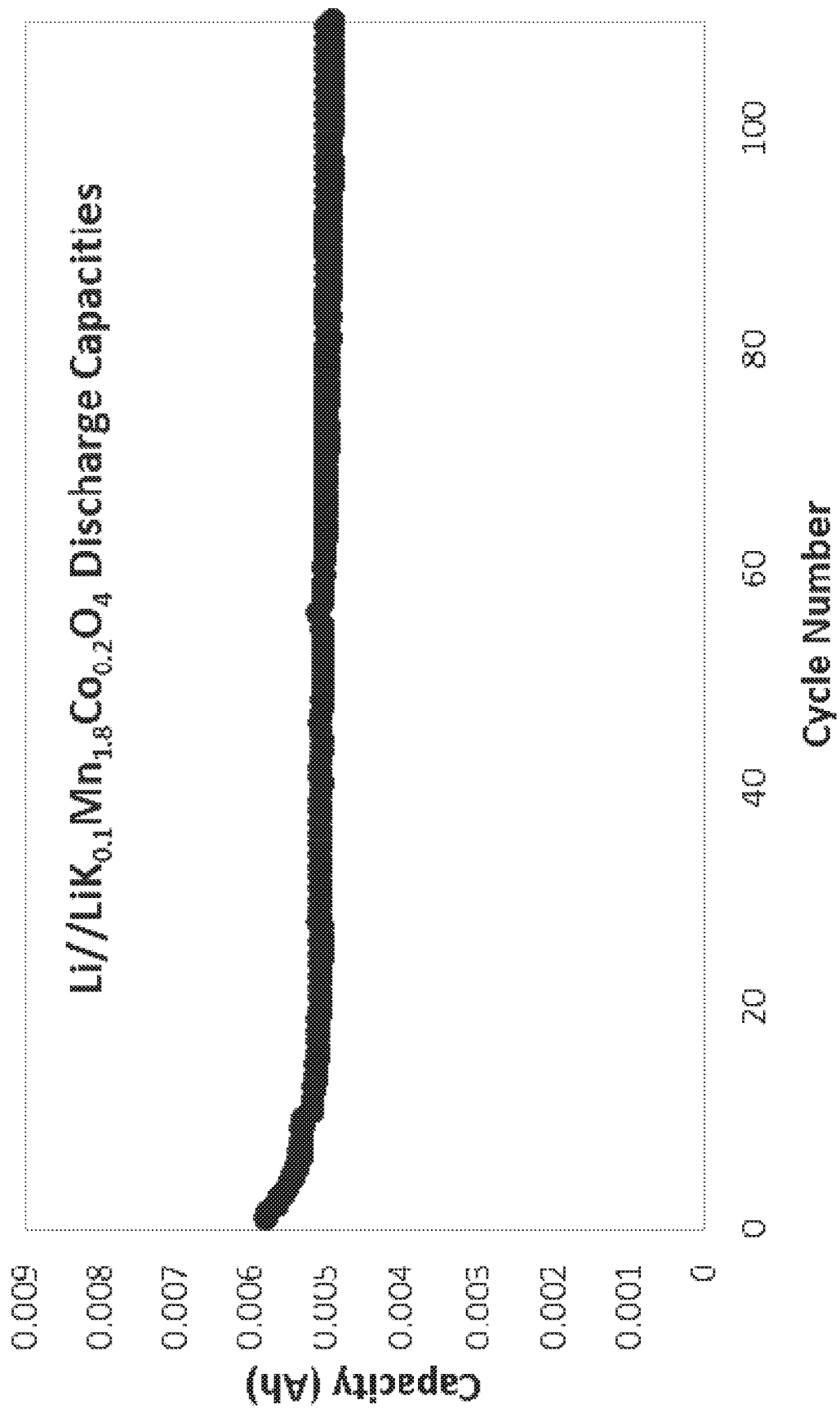
FIG. 10 is a graph illustrating specific discharge capacity over 100 cycles for a lithium cell containing stabilized lithium manganese-based $AB_2O_4$ spinel cathode with potassium doped "A" site and cobalt doped "B" site modifications according to an exemplary embodiment of the present disclosure.
Figure 11:
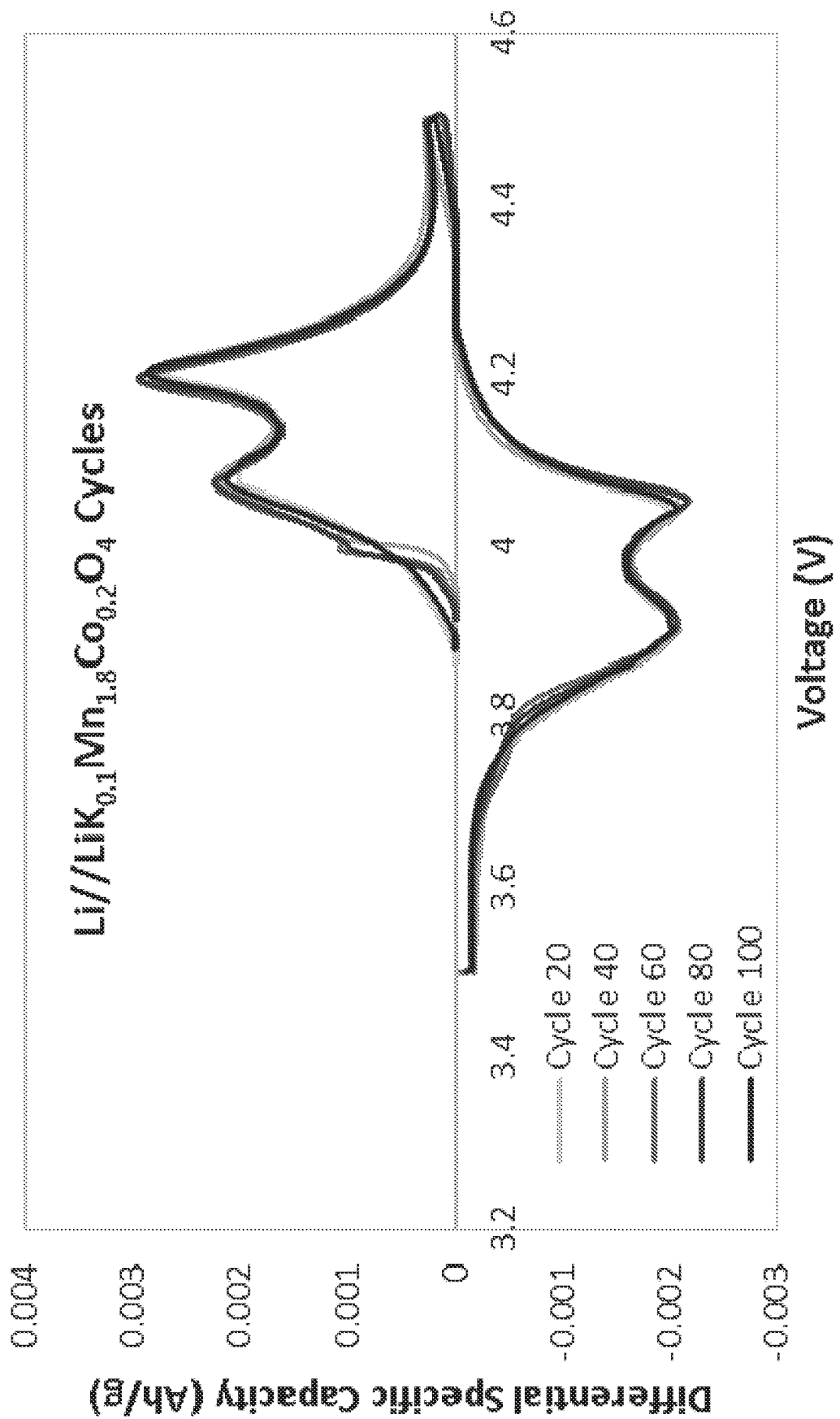
FIG. 11 is a graph of differential specific capacity at a 2.0 mA charge and discharge rate illustrating a lithium cell containing stabilized lithium manganese-based $AB_2O_4$ spinel cathode with potassium doped "A" site and cobalt doped "B" site modifications according to an exemplary embodiment of the present disclosure.

FIGS. 10 and 11 show the discharge capacity and specific differential capacity plots for lithium electrochemical cell 3, which was fabricated with $Li_xK_yMn_{2-z}Co_zO_4$ where x=1, y=0.1, and z=0.2 synthesized using the method described in the present disclosure. FIG. 10 shows exemplary discharge capacities through 110 cycles with select cycle life traces displayed in FIG. 11 for lithium electrochemical cells fabricated with $Li_xK_yMn_{2-z}Co_zO_4$ where x=1, y=0.1, and z=0.2 synthesized using the method described in the present disclosure. All cycles were cycled between 4.5 V to 3.5 V at a charge and discharge rate of 2 mA. This chart demonstrates excellent capacity retention through 110 cycles.

FIG. 11 is a differential capacity graph through 100 cycles illustrating exemplary cycle life traces for cycles 20, 40, 60, 80, and 100 for lithium electrochemical cells fabricated with $Li_xK_yMn_{2-z}Co_zO_4$ where x=1, y=0.1, and z=0.2 synthesized using the method described in the present disclosure. All cells were cycled between 4.5 V to 3.5 V at a charge and discharge rate of 2.0 mA. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. This figure shows the stability of the $Li_xK_yMn_{2-z}Co_zO_4$ chemistry where x=1, y=0.1, and z=0.2, as the measured differential capacity at each 20 cycle increment remains consistent.

Figure 12:
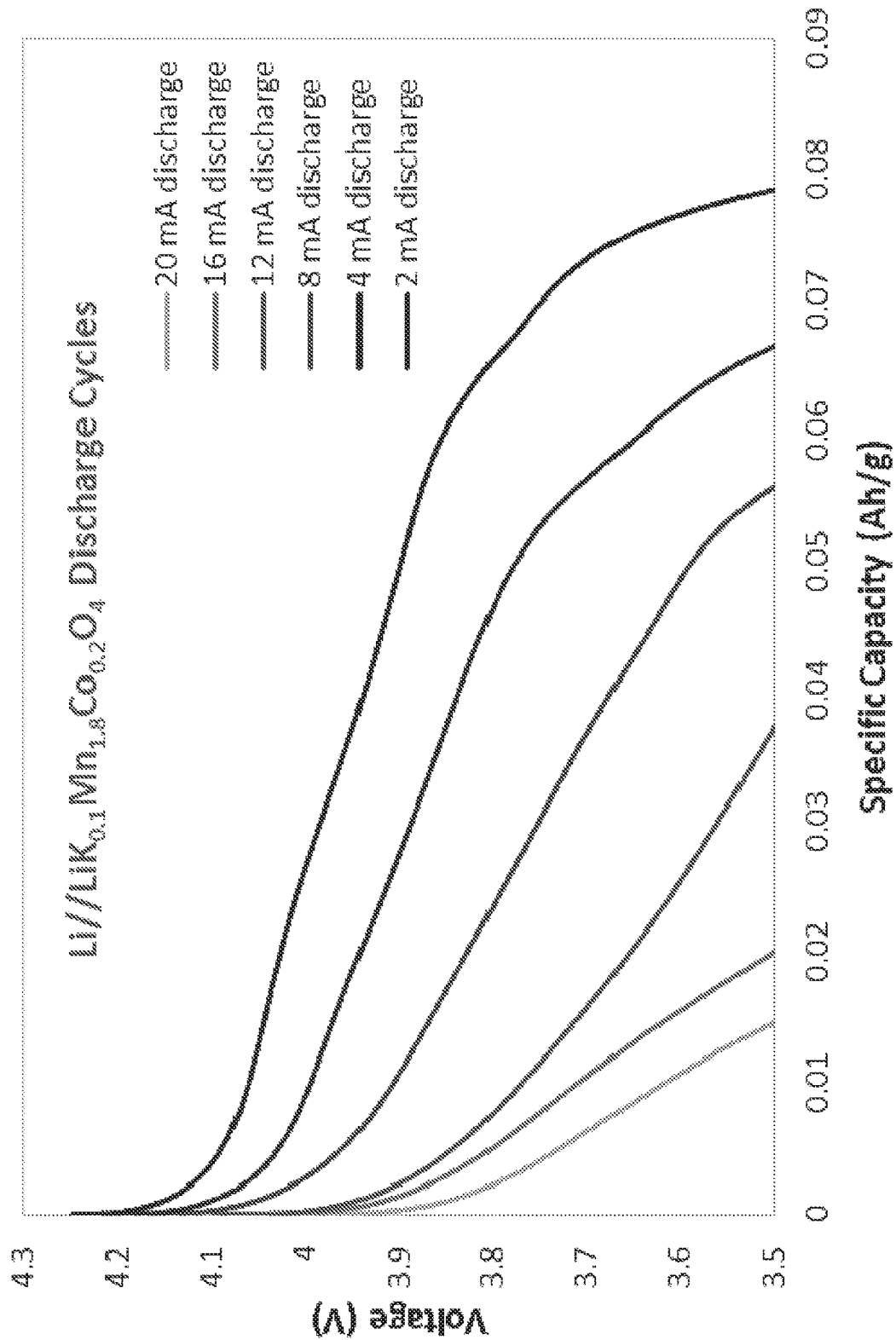
FIG. 12 is a graph of select discharge curves comparing varying discharge rates for a lithium cell containing stabilized lithium manganese-based $AB_2O_4$ spinel cathode with potassium doped "A" site and cobalt doped "B" site modifications according to an exemplary embodiment of the present disclosure.
Figure 13:
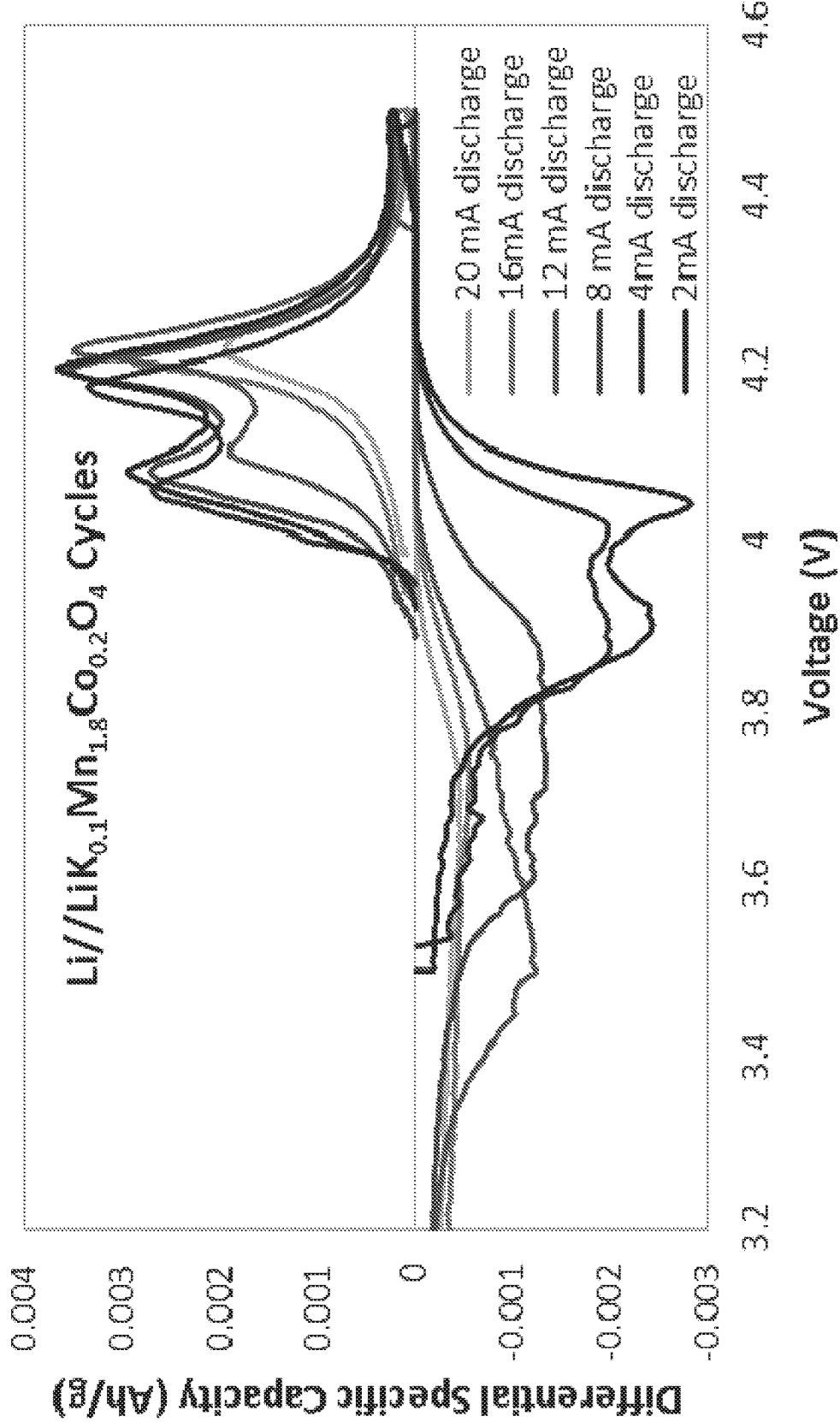
FIG. 13 is a graph of differential specific capacity comparing varying discharge rates for a single lithium cell containing stabilized lithium manganese-based $AB_2O_4$ spinel cathode with potassium doped "A" site and cobalt doped "B" site modifications according to an exemplary embodiment of the present disclosure.

FIGS. 12 and 13 show discharge capacity and select differential capacity traces for lithium electrochemical cells fabricated with $Li_xK_yMn_{2-z}Co_zO_4$ where x=1, y=0.1, and z=0.2 synthesized using the method described in the present disclosure. FIG. 12 shows exemplary discharge capacities through 146 cycles with select differential capacity curves displayed in FIG. 13. Cells were cycled between 4.5 V and 3.5 volts for discharge currents between 2.0 mA and 8.0 mA and 4.5 and 3.0 for discharge currents greater than 8.0 mA. Cycles 1-10 were charged and discharged at 2.0 mA, cycles 11-30 were charged at 2.0 mA and discharged at 4.0 mA, cycles 31-36 were charged at 2.0 mA and discharged at 8.0 mA, cycles 37-46 were charged at 2.0 mA and discharged at 12.0 mA, cycles 57-66 were charged and discharged at 2.0 mA, cycles 67-76 were charged at 2.0 mA and discharged at 12.0 mA, cycles 77-86 were charged and discharged at 2.0 mA, cycles 87-96 were charged at 2.0 mA and discharged at 16.0 mA, cycles 97-106 were charged and discharged at 2.0 mA, cycles 107-116 were charged at 2.0 mA and discharged at 20.0 mA, cycles 117-126 were charged and discharged at 2.0 mA, cycles 127-136 were charged at 2.0 mA and discharged at 20.0 mA, cycles 137-146 were charged and discharged at 2.0 mA. FIG. 12 shows that the cells retained their full capacity even after high rate discharges of 12.0, 16.0, and 20.0 mA. FIG. 13 illustrates the maintenance of the base thermodynamics of the cell after these high rate discharges, demonstrating the stability of the $Li_xK_yMn_{2-z}Co_zO_4$ chemistry where x=1, y=0.1, and z=0.2, as the measured differential capacity after each high rate discharge remains consistent.

Figure 14:
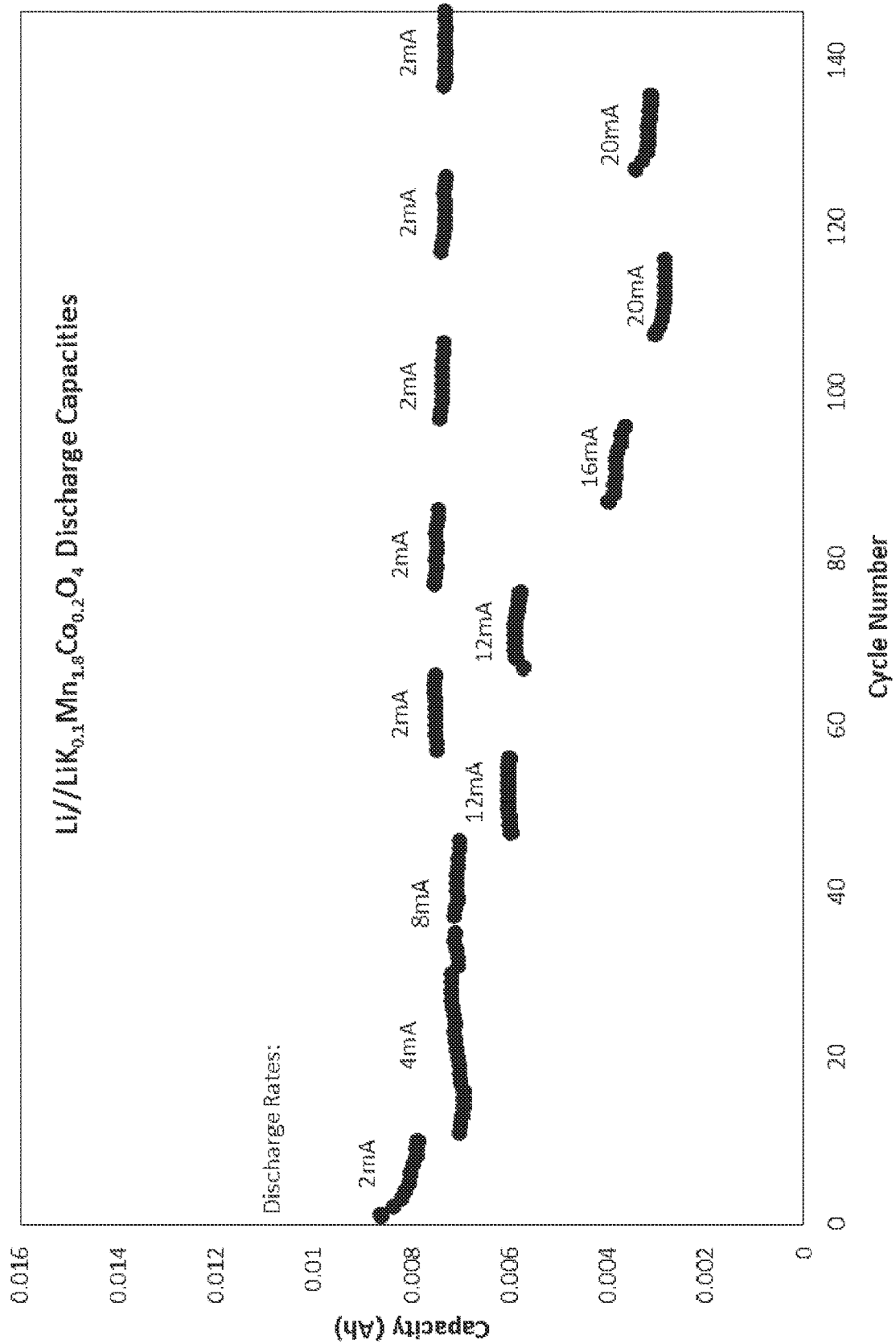
FIG. 14 is a graph illustrating capacity over 146 cycles for a lithium cell containing stabilized lithium manganese-based $AB_2O_4$ spinel cathode with potassium doped "A" site and cobalt doped "B" site modifications according to an exemplary embodiment of the present disclosure.
Figure 15:
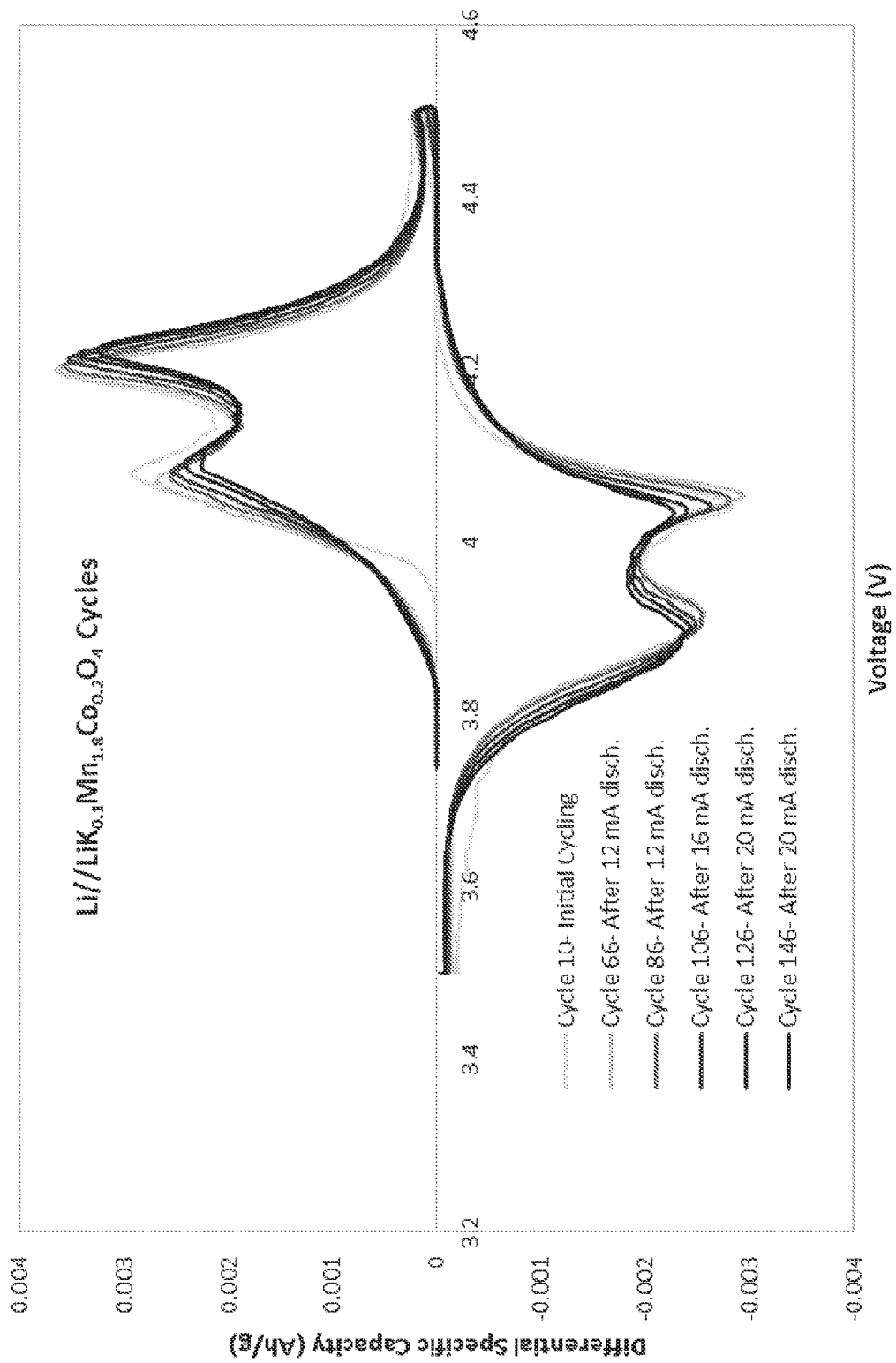
FIG. 15 is a graph of differential specific capacity at a 2.0 mA charge and discharge rate after high rate discharge cycles illustrating a lithium cell containing stabilized lithium manganese-based $AB_2O_4$ spinel cathode with potassium doped "A" site and cobalt doped "B" site modifications according to an exemplary embodiment of the present disclosure.

FIGS. 14 and 15 show discharge plots and differential capacity plots for incremental increases in discharge rate for electrochemical cell 4 with $Li_xK_yMn_{2-z}Co_zO_4$ where x=1, y=0.1, and z=0.2 synthesized using the method described in the present disclosure. All cells are cycled between 4.5 V and 3.5 V with a constant charge rate of 2.0 mA, and discharge rates of 2.0 mA, 4.0 mA, 8.0 mA, 12.0 mA, 16.0 mA, and 20.0 mA. FIG. 14 shows the achieved discharge capacity at the various rates and FIG. 15 shows the specific differential capacity of the same electrochemical cell with $Li_xK_yMn_{2-z}Co_zO_4$ where x=1, y=0.1, and z=0.2, where the charge portion of the chart demonstrates the integrity of the thermodynamics of the cathode material.

Figure 16:
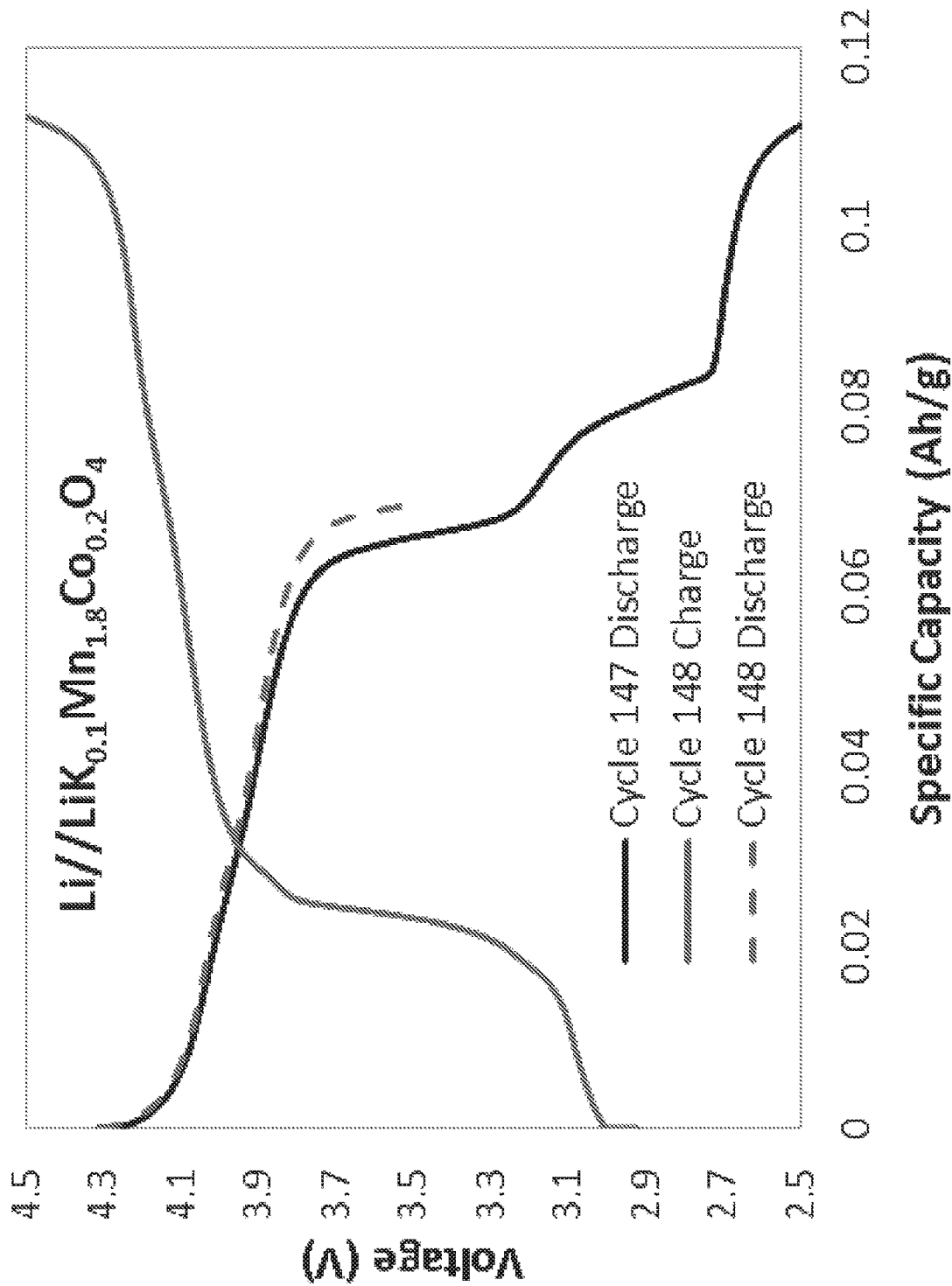
FIG. 16 is a graph illustrating the discharge/charge/discharge curve for cycle 147 and 148 for a lithium cell containing stabilized lithium manganese-based $AB_2O_4$ spinel cathode with potassium doped "A" site and cobalt doped "B" site modifications according to an exemplary embodiment of the present disclosure.

FIG. 16 shows the galvanostatic charge and discharge curve for an exemplary electrochemical cell with $Li_xK_yMn_{2-z}Co_zO_4$ where x=1, y=0.1, and z=0.2 synthesized using the method described in the present disclosure. The cell was cycled between 4.5 V to 3.5 V at 2 mA through cycle 146 according to the procedure outlined in FIG. 14. In cycle 147, the cell was discharged down to 2.5 V to demonstrate that the spinel material exhibits deep discharge capability as a result of the modifications with no negative effect on the cell after charged and discharged between 4.5 V and 3.5 V in cycle 148. The deep discharge to 2.5 V is shown achieving a 57% increase in capacity as compared to the 4.5 to 3.5 V discharge.

Figure 17:
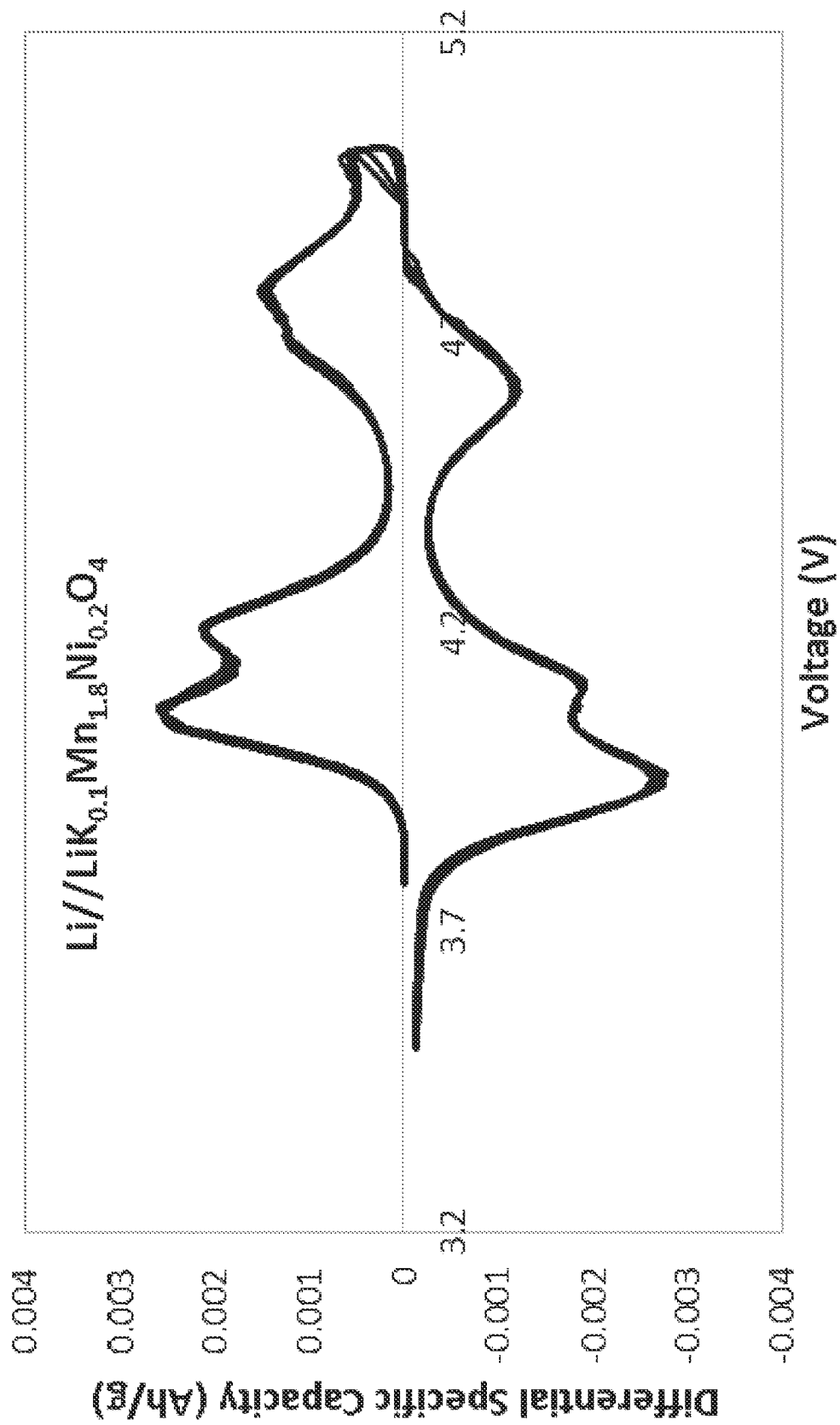
FIG. 17 is a graph illustrating the differential specific capacity at a 1.0 mA charge and discharge rate of a lithium cell containing stabilized lithium manganese-based $AB_2O_4$ spinel cathode with potassium doped "A" site and nickel doped "B" site modifications according to an exemplary embodiment of the present disclosure.
Figure 18:
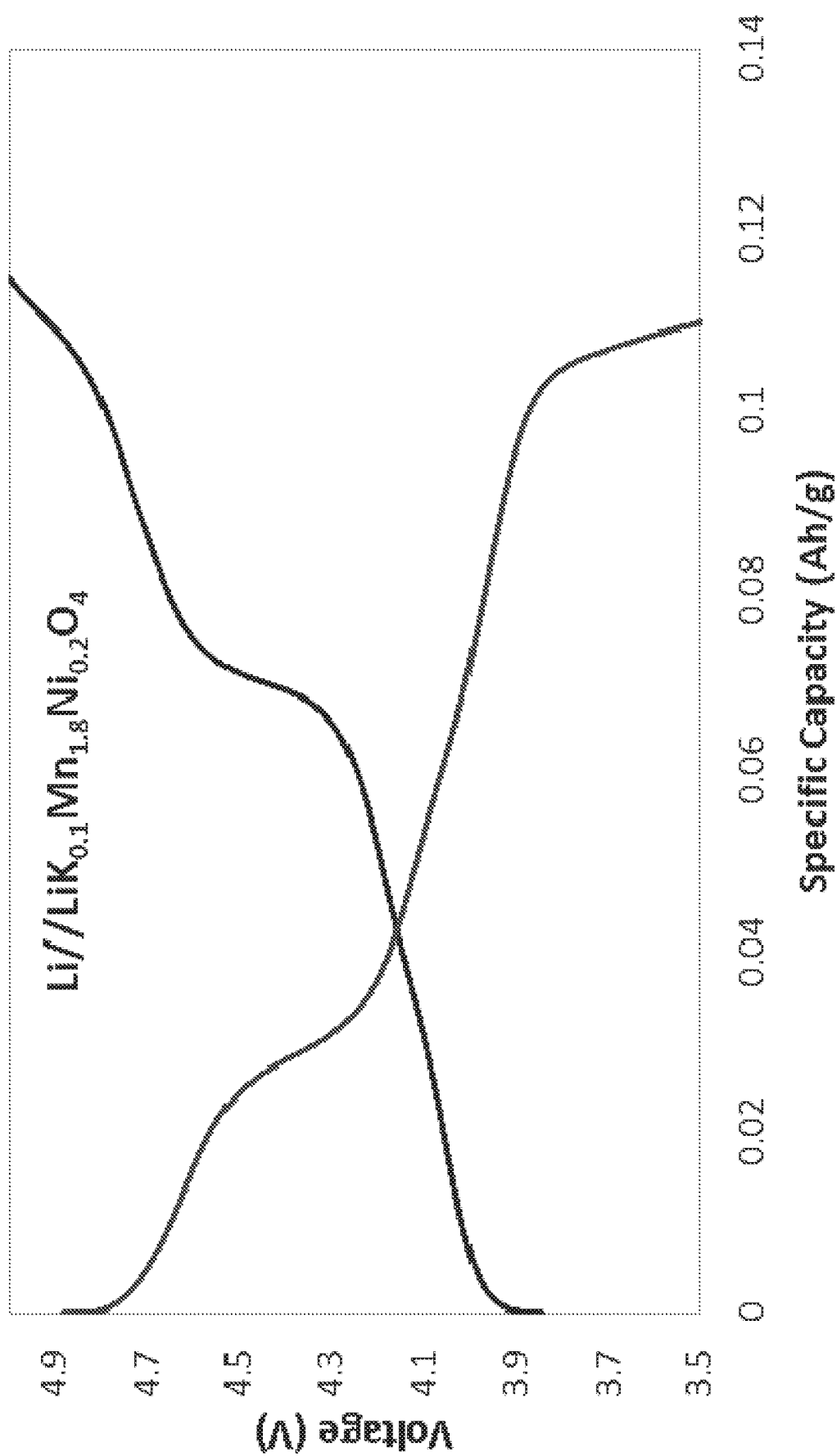
FIG. 18 is a graph of the charge and discharge curves for a 1.0 mA charge and discharge rate of a lithium cell containing stabilized lithium manganese-based $AB_2O_4$ spinel cathode with potassium doped "A" site and nickel doped "B" site modifications according to an exemplary embodiment of the present disclosure.

FIGS. 17 and 18 show the differential capacity and galvanostatic (charge/discharge) plots for lithium electrochemical cell 5, which was fabricated with $Li_xK_yMn_{2-z}Ni_zO_4$ where x=1, y=0.1, and z=0.2 synthesized using the method described in the present disclosure. The cell was cycled between 5.0 to 3.5 V at a charge and discharge rate of 1.0 mA. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. FIG. 17 illustrates the reproducible thermodynamics of the $Li_xK_yMn_{2-z}Ni_zO_4$ chemistry where x=1, y=0.1, and z=0.2 over repeated cycles. FIG. 18 illustrates a select charge and discharge curve, which shows an added high voltage thermodynamic plateau. This is a direct result of the nickel doped B site modification, and percentages of high vs. low voltage of the cell can be tailored by nickel content.

Figure 19:
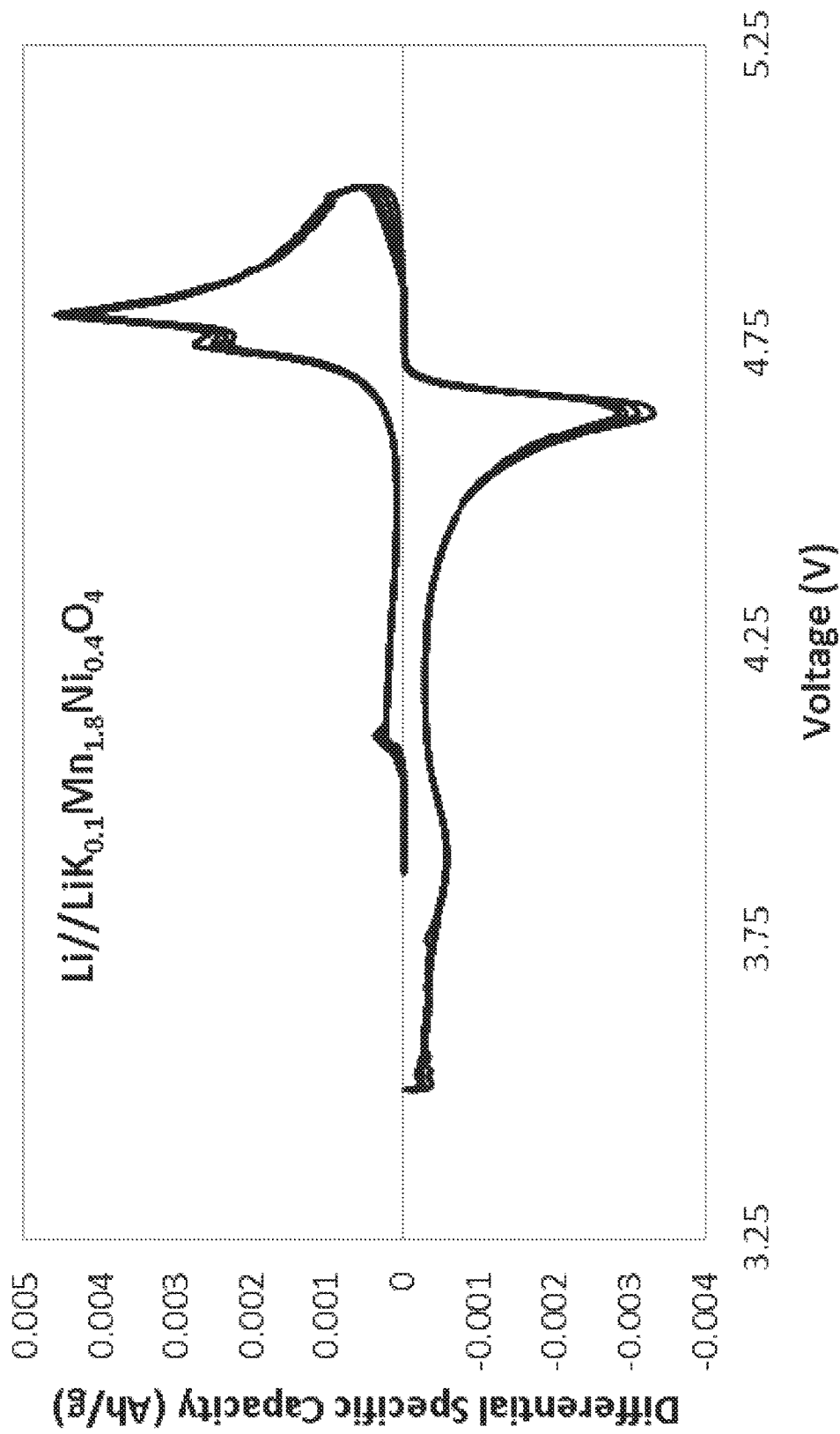
FIG. 19 is a graph illustrating the differential specific capacity at a 1.0 mA charge and discharge rate of a lithium cell containing stabilized lithium manganese-based $AB_2O_4$ spinel cathode with potassium doped "A" site and nickel doped "B" site modifications according to an exemplary embodiment of the present disclosure.
Figure 20:
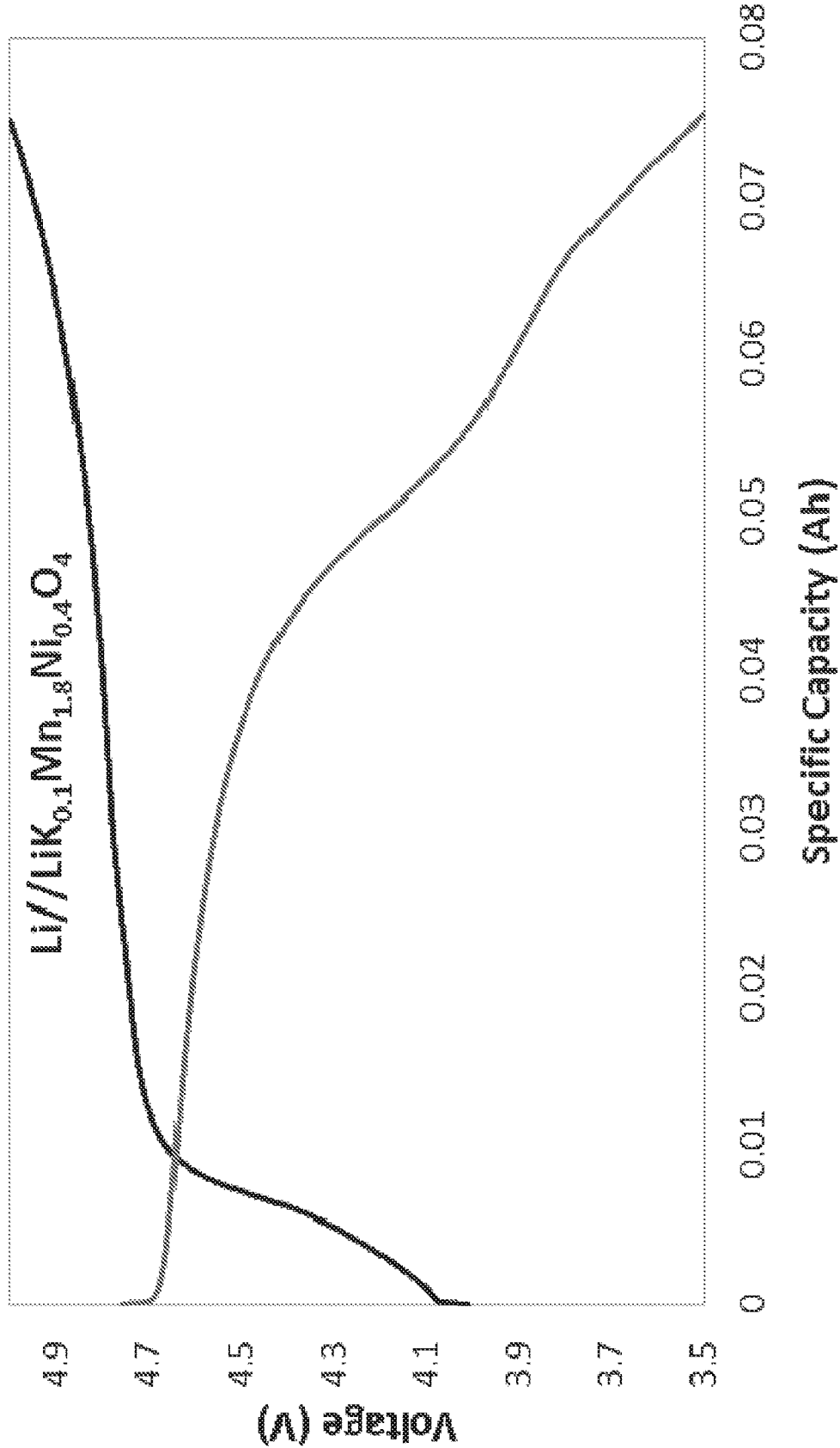
FIG. 20 is a graph of the charge and discharge curves for a 1.0 mA charge and discharge rate of a lithium cell containing stabilized lithium manganese-based $AB_2O_4$ spinel cathode with potassium doped "A" site and nickel doped "B" site modifications according to an exemplary embodiment of the present disclosure.

FIGS. 19 and 20 show the differential capacity and galvanostatic (charge/discharge) plots for lithium electrochemical cell 1, which was fabricated with $Li_xK_yMn_{2-z}Ni_zO_4$ where x=1, y=0.1, and z=0.4 synthesized using the method described in the present disclosure. The cell was cycled between 5.0 to 3.5 V at a charge and discharge rate of 1.0 mA. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. FIG. 19 illustrates the reproducible thermodynamics of the $Li_xK_yMn_{2-z}Ni_zO_4$ chemistry where x=1, y=0.1, and z=0.4 over repeated cycles. FIG. 20 illustrates a select charge and discharge curve, which shows an added high voltage thermodynamic plateau. This is a direct result of the nickel doped B site modification, and percentages of high vs. low voltage of the cell can be tailored by nickel content.

Figure 21:
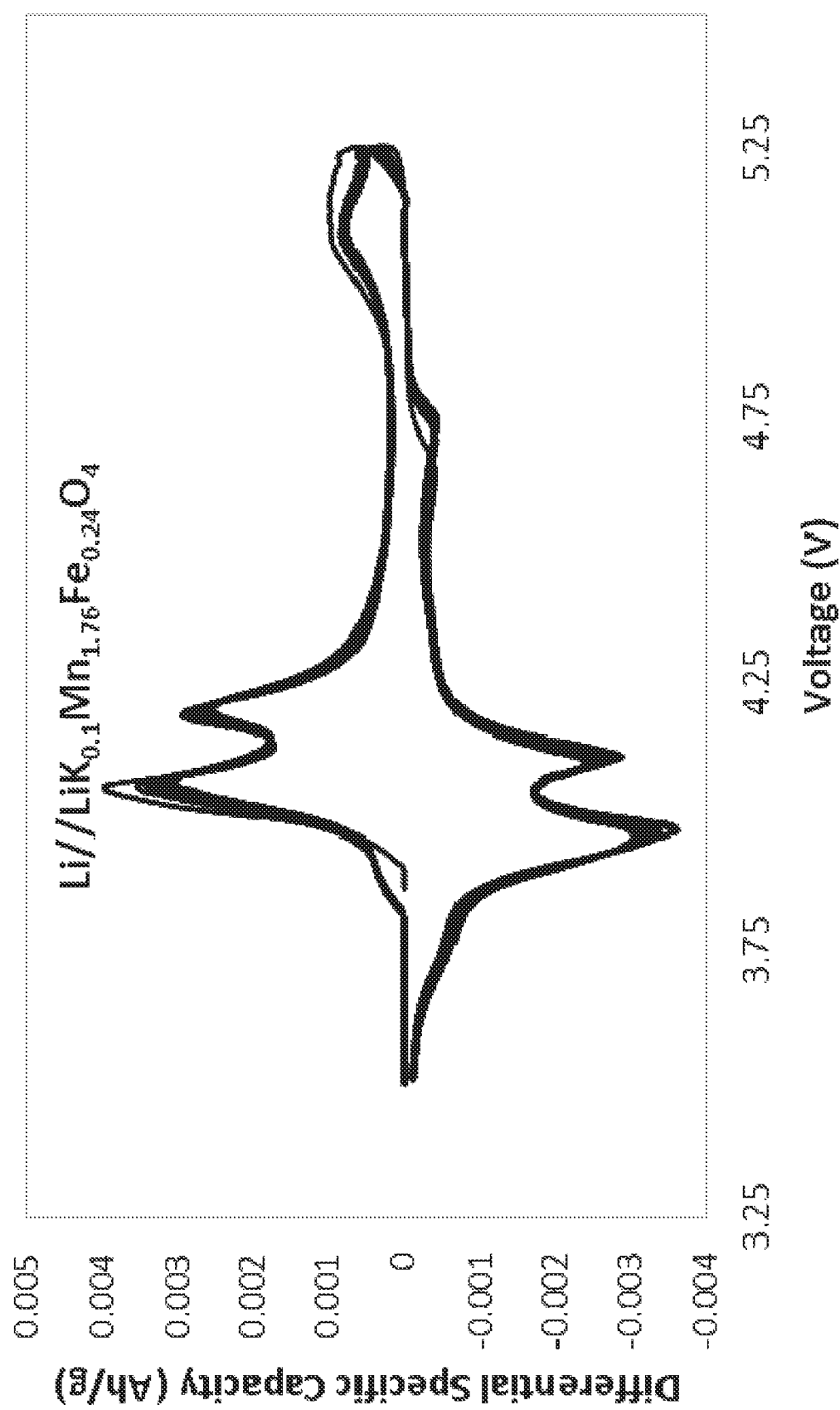
FIG. 21 is a graph illustrating the differential specific capacity at a 1.0 mA charge and discharge rate of a lithium cell containing stabilized lithium manganese-based $AB_2O_4$ spinel cathode with potassium doped "A" site and iron doped "B" site modifications according to an exemplary embodiment of the present disclosure.
Figure 22:
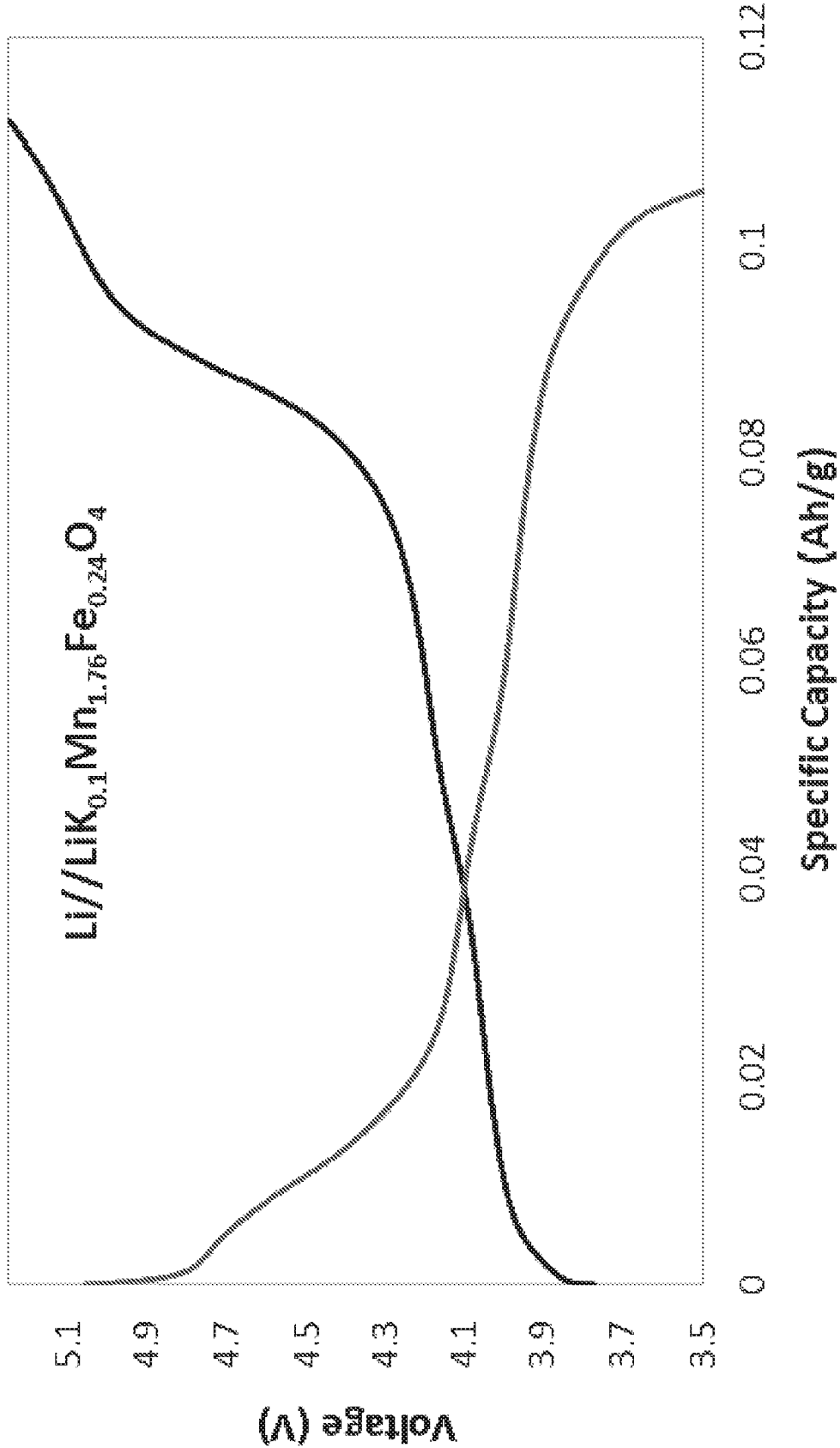
FIG. 22 is a graph of the charge and discharge curves for a 1.0 mA charge and discharge rate of a lithium cell containing stabilized lithium manganese-based $AB_2O_4$ spinel cathode with potassium doped "A" site and iron doped "B" site modifications according to an exemplary embodiment of the present disclosure.

FIGS. 21 and 22 show the differential capacity and galvanostatic (charge/discharge) plots for lithium electrochemical cells fabricated with $Li_xK_yMn_{2-z}Fe_zO_4$ where x=1, y=0.1, and z=0.24 synthesized using the method described in the present disclosure. The cell was cycled between 5.25 to 3.5 V at a charge and discharge rate of 1.0 mA. Differential capacity traces provide information regarding the underlying thermodynamics and kinetics of an electrochemical cell. The differential capacity data uses galvanostatic control of the electrochemical system being tested, and plots the capacity increase (charge) or decrease (discharge) as a function of potential. FIG. 21 illustrates the reproducible thermodynamics of the $Li_xK_yMn_{2-z}Fe_zO_4$ chemistry where x=1, y=0.1, and z=0.24 over repeated cycles. FIG. 22 illustrates a select charge and discharge curve, which shows an added high voltage thermodynamic plateau. This is a direct result of the nickel doped B site modification, and percentages of high vs. low voltage of the cell can be tailored by iron content.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of preparing a homogeneously dispersed potassium-modified lithium manganese-based $Li_xK_yMn_{2-z}Me_zO_4$ spinel cathode material, the method comprising:
   mixing a manganese source and a Group VIII Period 4 source to form a first mixture;
   calcining the first mixture to produce a manganese mixed metal-based metal oxide;
   mixing the manganese mixed metal-based metal oxide, a lithium source, and a potassium source to produce a second mixture; and
   calcining the second mixture to produce the homogeneously dispersed potassium-modified lithium manganese-based $Li_xK_yMn_{2-z}Me_zO_4$ spinel cathode material, wherein Me is iron.

2. The method according to claim 1, wherein the lithium source is selected from a group consisting of lithium carbonate, lithium hydroxide, lithium oxide, and lithium peroxide, wherein the potassium source is selected from a group consisting of potassium carbonate, potassium hydroxide, potassium oxide, and potassium peroxide, and wherein the manganese source is selected from a group consisting of manganese acetate and manganese nitrate.

3. The method according to claim 1, wherein x ranges from 0.05 to 1.95, wherein y ranges from 0.05 to 0.2, and wherein z ranges from 0.005 to 0.6.

4. The method according to claim 1, further comprising: mixing ammonium hydroxide with the first mixture to form an intermediate gel; and drying the intermediate gel, wherein the manganese source is manganese acetate, and wherein the Group VIII Period 4 source is iron acetate.

5. The method according to claim 4, wherein the first mixture is calcined at a time ranging from 0.5 hours to 2 hours and at a temperature ranging from 300° C. to 450° C., and wherein the second mixture is calcined at a time ranging from 12 hours to 72 hours and at a temperature ranging from 600° C. to 1200° C.

6. The method according to claim 1, further comprising: mixing the first mixture with a chelating agent to form an intermediate mixture; and calcining the intermediate mixture to produce an ash, wherein the manganese source is manganese nitrate, and wherein the Group VIII Period 4 source is iron nitrate.

7. The method according to claim 6, wherein the intermediate mixture is calcined for a time ranging from 1 hour to 4 hours and at a temperature ranging from 350° C. to 800° C., and wherein the second mixture is calcined for a time ranging from 12 hours to 72 hours and at a temperature ranging from 600° C. to 1200° C.

8. A homogeneously dispersed, potassium-modified lithium manganese-based $Li_xK_yMn_{2-z}Me_zO_4$ spinel cathode material, prepared by a process comprising:
   mixing a manganese source and a Group VIII Period 4 source to form a first mixture;
   calcining the first mixture to produce a manganese mixed metal-based metal oxide;
   mixing the manganese mixed metal-based metal oxide, a lithium source, and a potassium source to produce a second mixture; and
   calcining the second mixture to produce the homogeneously dispersed potassium-modified lithium manganese-based $Li_xK_yMn_{2-z}Me_zO_4$, $AB_2O_4$ spinel cathode material, wherein Me is iron.

9. The homogeneously dispersed, potassium-modified lithium manganese-based $Li_xK_yMn_{2-z}Me_zO_4$ spinel cathode material according to claim 8, wherein the lithium source is selected from a group consisting of lithium carbonate, lithium hydroxide, lithium oxide, and lithium peroxide, wherein the potassium source is selected from a group consisting of potassium carbonate, potassium hydroxide, potassium oxide, and potassium peroxide, and wherein the manganese source is selected from a group consisting of manganese acetate and manganese nitrate.

10. The homogeneously dispersed, potassium-modified lithium manganese-based $Li_xK_yMn_{2-z}Me_zO_4$ spinel cathode material according to claim 8, wherein x ranges from 0.05 to 1.95, wherein y ranges from 0.05 to 0.2, and wherein z ranges from 0.005 to 0.6.

11. The homogeneously dispersed, potassium-modified lithium manganese-based $Li_xK_yMn_{2-z}Me_zO_4$ spinel cathode material according to claim 8, wherein the process further comprises: mixing ammonium hydroxide with the first mixture to form an intermediate gel; and drying the intermediate gel, wherein the manganese source is manganese acetate, and wherein the Group VIII Period 4 source is iron acetate.

12. The homogeneously dispersed, potassium-modified lithium manganese-based $Li_xK_yMn_{2-z}Me_zO_4$ spinel cathode material according to claim 11, wherein the process further comprises: calcining the first mixture for a time ranging from 0.5 hours to 2 hours and at a temperature ranging from 300° C. to 450° C.; and calcining the second mixture for a time ranging from 12 to 72 hours and at a temperature ranging from 600° C. to 1200° C.

13. The homogeneously dispersed, potassium-modified lithium manganese-based $Li_xK_yMn_{2-z}Me_zO_4$ spinel cathode material according to claim 8, wherein the process further comprises: mixing the first mixture with a chelating agent to form an intermediate mixture; and heating the intermediate mixture to produce an ash, wherein the manganese source is manganese nitrate, and wherein the Group VIII Period 4 source is iron nitrate.

14. The homogeneously dispersed, potassium-modified lithium manganese-based $Li_xK_yMn_{2-z}Me_zO_4$ spinel cathode material according to claim 13, wherein the process further comprises: calcining the intermediate mixture at a time ranging from 0.5 hours to 2 hours and at a temperature ranging from 300° C. to 450° C., and calcining the second mixture at a time ranging from 12 hours to 72 hours and at a temperature ranging from 600° C. to 1200° C.

15. A lithium electrochemical cell comprising: an anode; and
   a cathode comprising a homogeneously dispersed potassium-modified lithium manganese-based $Li_xK_yMn_{2-z}Me_zO_4$ spinel cathode material prepared by a process comprising:
   mixing a manganese source and a Group VIII Period 4 source to form a first mixture;
   calcining the first mixture to produce a manganese mixed metal-based metal oxide;
   mixing the manganese mixed metal-based metal oxide, a lithium source, and a potassium source to produce a second mixture; and calcining the second mixture to produce the homogeneously dispersed potassium-modified lithium manganese-based $Li_xK_yMn_{2-z}Me_zO_4$ spinel cathode material, wherein Me is iron.

16. The lithium electrochemical cell according to claim 15, wherein the lithium source is selected from a group consisting of lithium carbonate, lithium hydroxide, lithium oxide, and lithium peroxide, wherein the potassium source is selected from a group consisting of potassium carbonate, potassium hydroxide, potassium oxide, and potassium peroxide, and wherein the manganese source is selected from a group consisting of manganese acetate and manganese nitrate.

17. The lithium electrochemical cell according to claim 15, wherein x ranges from 0.05 to 1.95, wherein y ranges from 0.05 to 0.2, and wherein z ranges from 0.005 to 0.6.

18. The lithium electrochemical cell according to claim 15, wherein the process further comprises: mixing ammonium hydroxide with the first mixture to form an intermediate gel; drying the intermediate gel; calcining the first mixture at a time ranging from 0.5 hours to 2 hours and at a temperature ranging from 300° C. to 450° C.; and calcining the second mixture at a time ranging from 12 to 72 hours and at a temperature ranging from 600° C. to 1200° C., wherein the manganese source is manganese acetate, and wherein the Group VIII Period 4 source is iron acetate.

19. The lithium electrochemical cell according to claim 15, wherein the process further comprises: mixing the first mixture with a chelating agent to form an intermediate mixture; calcining the intermediate mixture at a time ranging from 0.5 hours to 2 hours and at a temperature ranging from 300° C. to 450° C. to produce an ash; and calcining the second mixture at a time ranging from 12 hours to 72 hours and at a temperature ranging from 600° C. to 1200° C., wherein the manganese source is manganese nitrate, and wherein the Group VIII Period 4 source is iron nitrate.

20. The lithium electrochemical cell according to claim 15, wherein the cathode material further comprises a conductive carbon and a binder, wherein the conductive carbon is a compound selected from a group consisting of carbon black, graphite, carbon nanofibers, and carbon nanoparticles, and wherein the binder is a compound selected from a group consisting of polytetrafluoroethylene, polyvinylidene fluoride, and latex.

* * * * *